(12) United States Patent
Noess

(10) Patent No.: US 11,119,488 B2
(45) Date of Patent: Sep. 14, 2021

(54) STEERING CONTROLLER FOR AN AUTONOMOUS VEHICLE WITH VELOCITY REGULATION

(71) Applicant: AGCO International GmbH, Neuhausen (CH)

(72) Inventor: Christian Noess, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 337 days.

(21) Appl. No.: 16/248,826

(22) Filed: Jan. 16, 2019

(65) Prior Publication Data

US 2019/0220031 A1    Jul. 18, 2019

Related U.S. Application Data

(60) Provisional application No. 62/618,203, filed on Jan. 17, 2018.

(51) Int. Cl.
| | |
|---|---|
| *G05D 1/02* | (2020.01) |
| *G05D 1/00* | (2006.01) |
| *B62D 11/00* | (2006.01) |
| *B62D 11/04* | (2006.01) |
| *B62D 15/02* | (2006.01) |
| *B62D 1/28* | (2006.01) |
| *A01B 69/04* | (2006.01) |
| *G06F 16/29* | (2019.01) |

(52) U.S. Cl.
CPC ......... *G05D 1/0212* (2013.01); *A01B 69/008* (2013.01); *B62D 1/283* (2013.01); *B62D 11/003* (2013.01); *B62D 11/04* (2013.01); *B62D 15/025* (2013.01); *G05D 1/0088* (2013.01); *G05D 1/0223* (2013.01); *G05D 1/0276* (2013.01); *G06F 16/29* (2019.01); *G05D 2201/0201* (2013.01)

(58) Field of Classification Search
CPC ..... B62D 15/025; B62D 1/283; B62D 11/003
See application file for complete search history.

(56) References Cited

U.S. PATENT DOCUMENTS

| | | | |
|---|---|---|---|
| 5,315,295 | A | 5/1994 | Fujii |
| 2017/0357262 | A1 | 12/2017 | Dix et al. |

OTHER PUBLICATIONS

European Patent Office, Search Report for related EP Application No. 19152308.3, dated Jun. 7, 2019.

*Primary Examiner* — Alan D Hutchinson
*Assistant Examiner* — Andy Schneider

(57) ABSTRACT

A mobile machine including a chassis, a plurality of ground-engaging elements, a plurality of actuators for driving movement of the ground-engaging elements, and a controller for controlling each of the actuators to cause the mobile machine to follow a guidance path along a ground surface. The controller is configured to generate a first set of control values for driving the machine according to a first heading based on a reference heading error of the machine, generate a second set of control values for driving the machine according to a second heading based on a distance heading error of the machine, generate a current machine velocity using a prescribed machine velocity, the reference heading error, and the distance heading error, and generate control signals for driving the machine by combining the first set of control values, the second set of control values, and the current machine velocity.

9 Claims, 18 Drawing Sheets

STEERING CONTROLLER FOR AN AUTONOMOUS VEHICLE WITH VELOCITY REGULATION

RELATED APPLICATIONS

The present application claims priority under 35 U.S.C. § 119 to U.S. Provisional Application Ser. No. 62/618,203, filed Jan. 17, 2018. The full disclosure, in its entirety, of U.S. Provisional Application Ser. No. 62/618,203 is hereby incorporated by reference.

FIELD

Embodiments of the present invention relate to control systems for autonomous machines. More particularly, embodiments of the present invention relate to navigational control systems for enabling autonomous machines to follow guidance paths.

BACKGROUND

Machinery and processes used in the agriculture industry continue to evolve with advancements in technology. Computer technology and Global Navigation Satellite Systems (GNSS), for example, have enabled the use of automated guidance on some agricultural machines. Automated guidance enables a machine to automatically follow a designated path without operator control or input and has improved the efficiency of agricultural operations not only by enabling more precise operation (e.g., less overlap and fewer missed areas), but also by allowing the operator to focus on other areas of the machine's operation, such as user-defined settings that can affect performance and efficiency.

Another technology that is increasingly of interest within the agriculture industry is full machine automation. A machine that is fully automated may be operated without any user input or control and, therefore, may be designed without an operator seat or cabin. Eliminating operator space renders machine design more flexible. A machine with no operator space, for example, may be smaller and simpler than a manned machine. However, the automated control of such machines must be even more robust than automated guidance on manned machines as there is no operator oversight to handle anomalies in operation or to make corrections.

The above section provides background information related to the present disclosure which is not necessarily prior art.

SUMMARY

A mobile machine according to an embodiment of the invention comprises a chassis, a plurality of ground-engaging elements for supporting the chassis on a ground surface and propelling the chassis relative to the ground surface, each of the plurality of ground-engaging elements being at a fixed angle relative to the chassis, a plurality of actuators for driving movement of the ground-engaging elements, each of the actuators being configured to drive movement of at least one of the ground-engaging elements independently of the other ground-engaging elements, and a controller for controlling each of the actuators to cause the mobile machine to follow a guidance path along a ground surface.

The controller is configured to receive a designated machine velocity, generate a first set of control values for driving the machine according to a first heading based on a reference heading error of the machine, generate a second set of control values for driving the machine according to a second heading based on a distance heading error of the machine, generate a current machine velocity using the designated machine velocity, the reference heading error, and the distance heading error, generate control signals for driving the machine by combining the first set of control values, the second set of control values, and the current machine velocity, and use the control signals to control the actuators to thereby cause the machine to follow the guidance path at the current velocity.

These and other important aspects of the present invention are described more fully in the detailed description below. The invention is not limited to the particular methods and systems described herein. Other embodiments may be used and/or changes to the described embodiments may be made without departing from the scope of the claims that follow the detailed description.

DRAWINGS

Embodiments of the present invention are described in detail below with reference to the attached drawing figures, wherein.

Figure 1:
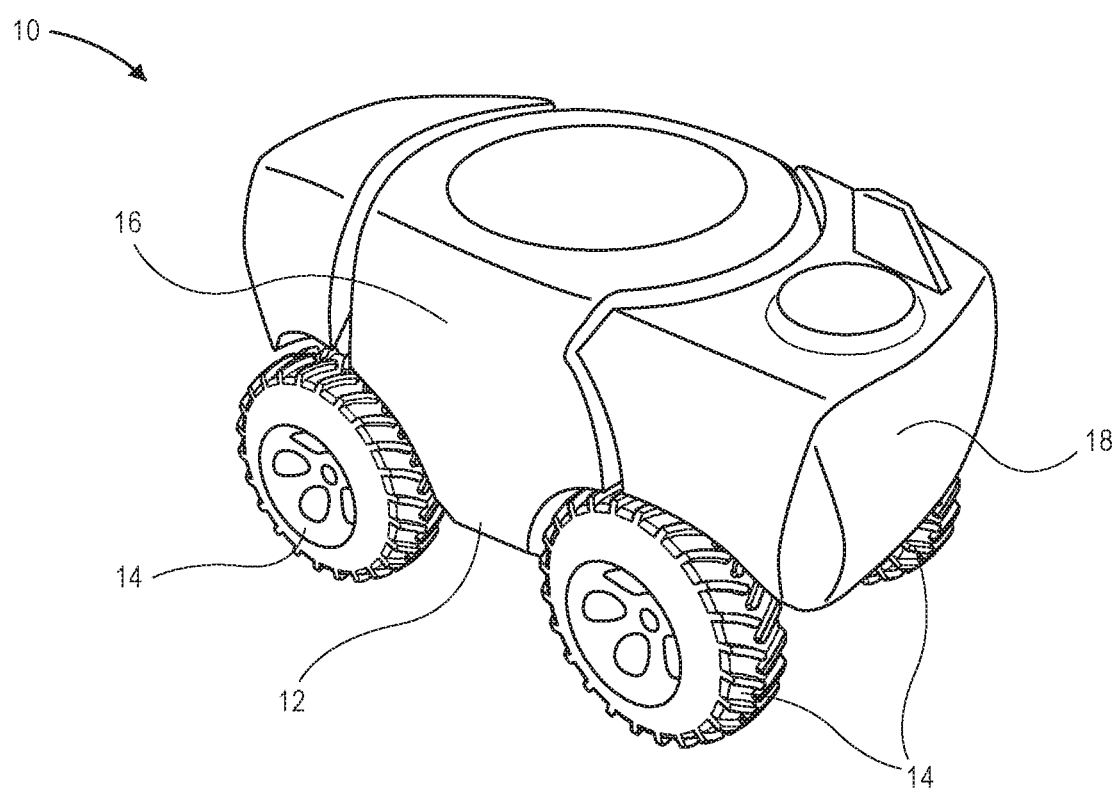
FIG. 1 is a perspective view of an autonomous mobile machine constructed in accordance with embodiments of the invention.

The drawing figures do not limit the present invention to the specific embodiments disclosed and described herein. The drawings are not necessarily to scale, emphasis instead being placed upon clearly illustrating the principles of the invention.

DESCRIPTION

The following detailed description of embodiments references the accompanying drawings. The embodiments are intended to describe aspects of the invention in sufficient detail to enable those skilled in the art to practice the invention. Other embodiments can be utilized and changes can be made without departing from the spirit and scope of the invention as defined by the claims. The following description is, therefore, not to be taken in a limiting sense. Further, it will be appreciated that the claims are not necessarily limited to the particular embodiments set out in this description.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

When elements or components are referred to herein as being "connected" or "coupled," the elements or components may be directly connected or coupled together or one or more intervening elements or components may also be present. In contrast, when elements or components are referred to as being "directly connected" or "directly coupled," there are no intervening elements or components present.

Turning now to the drawing figures, and initially FIG. 1, an exemplary mobile machine 10 constructed in accordance with embodiments of the invention is illustrated. The machine 10 is an autonomous vehicle configured to perform an agricultural operation such as planting seeds. The machine 10 includes a chassis 12, four wheels 14, a product holding and distribution system 16, and a communications and control system 18. The four wheels 14 are configured to support the chassis 12 on a ground surface and propel the machine 10 along the ground surface. Two or more of the wheels 14 are driven to propel the machine 10 and each of the wheels 14 is at a fixed angle relative to the chassis 12. In other words, none of the wheels 14 is configured to pivot from side to side to steer the machine 10. Rather, the communications and control system 18 steers the machine 10 by rotating driven wheels on different sides of the machine 10 at different rates—a so-called "skid steer" system. The product holding and distribution system 16 includes a tank (not shown) for holding seeds to be planted in a field. An applicator (not shown) for applying or distributing the product includes a mechanism for placing seed in the ground.

Figure 2:
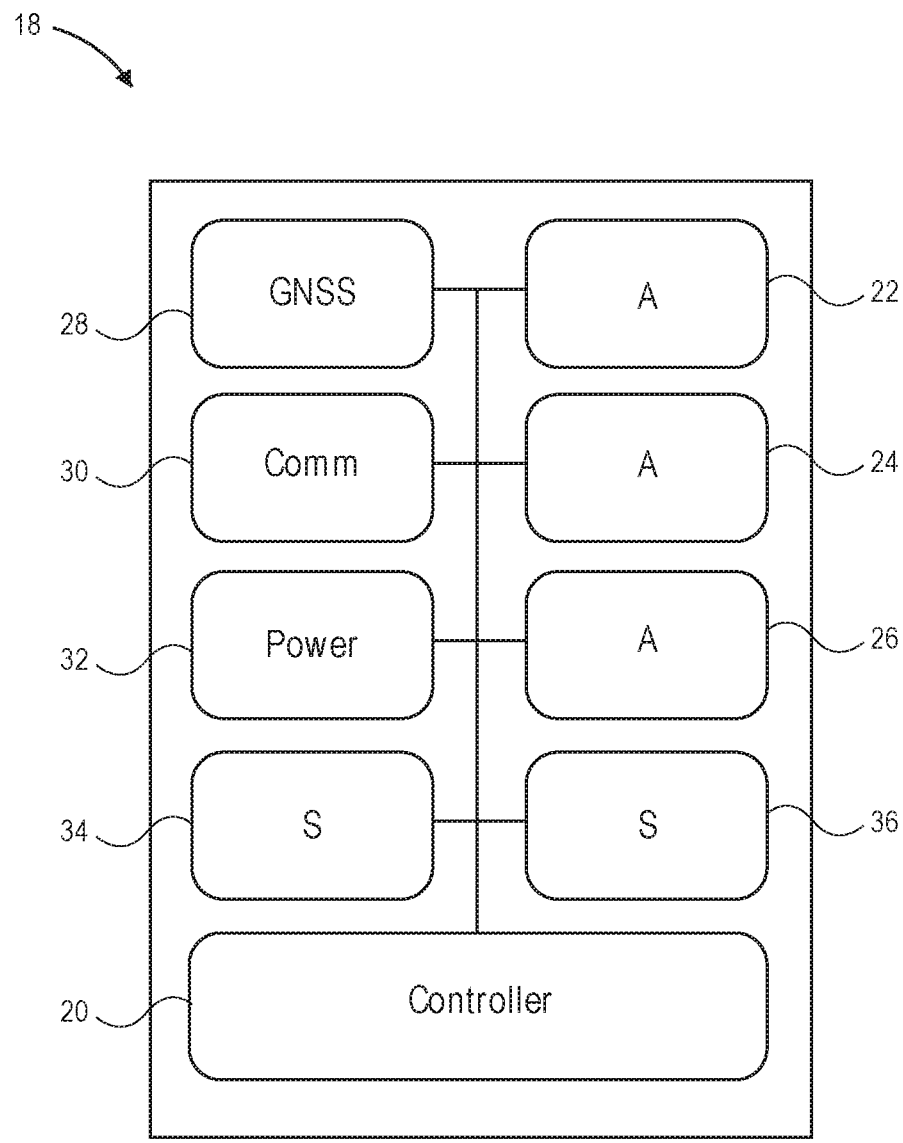
FIG. 2 is a block diagram of various components of a communication and control system of the mobile machine of FIG. 1.

A block diagram depicting various components of the communications and control system 18 is depicted in FIG. 2 and includes a controller 20, two actuators 22, 24 for driving two or more of the wheels 14, an actuator 26 for operating the product holding and distribution system 16, a positioning component 28, a communications component 30, a power source 32, and two or more sensors 34, 36. The actuators 22, 24 for driving the wheels 14 include electric motors with each electric motor driving one of the rear wheels 14. Each of the actuators 22, 24 is driven independently of the other such that the wheels 14 may be operated at different rotational speeds to thereby steer the machine 10. The positioning component 28 uses a global navigation satellite system (GNSS) or similar technology to determine a geographic position of the machine 10. The geographic position of the machine 10 may be used, for example, to navigate the machine 10 according to a guidance path 38 and to generate a work record. The communications component 30 enables the machine 10 to communicate wirelessly with external devices or entities such as other autonomous machines and/or a central control unit controlling operation of the machine 10. The power source 32 stores energy and energizes the other components of the machine 10 and may include a rechargeable battery. The sensors 34, 36 collect machine state data, environmental data, or both. Machine state data may include, for example, operating status, fill level of the product holding and distribution system 16 or inertial movement of the machine 10. Environmental data may include, for example, ground surface features or ambient weather information.

The controller 20 communicates with the other components of the communications and control system 18 and generally directs operation of the system 18 and the machine 10. The controller 20 preferably includes a digital integrated circuit and may be or include a general use, commercial off-the-shelf computer processor. Alternatively, the controller 20 may be a programmable logic device configured for operation with the system 18 or may be an application specific integrated circuit (ASIC) especially manufactured for use in the system 18. While illustrated as a single component in the block diagram of FIG. 2, the controller 20 may include two or more separate devices working in cooperation to control operation of the system 18. Furthermore, if the controller 20 includes multiple elements, such as multiple integrated circuits, the elements may be placed at various places on the machine 10 and in wired or wireless communication with each other.

The machine 10 may be between one-half meter and one meter in length, between one-fourth and one-half meter in width, and between one-fourth meter and one meter in height. It will be appreciated, however, that principles of the present invention may be used with machines of varying sizes and configurations and that the particular size and configuration of the machine 10 is not critical. In some applications it is desirable to use a relatively small machine 10. Advantages of using relatively small, autonomous machines 10 for agricultural operations include reduced cost, improved scalability, less environmental impact, greater reliability and increased productivity.

The use of relatively small, autonomous machines 10 presents advantages for some agricultural operations. By way of example, small autonomous machines 10 cost less to build because they do not require an operator cabin or operator environment and therefore require fewer materials to build and are simpler to design and manufacture. Operations involving small autonomous machines 10 may be scaled from one or two machines 10 to hundreds of machines 10 depending on the size and needs of the operation, and their operation may be more environmentally friendly because they may be electric, consume less energy and avoid soil damage such as soil compaction. These machines 10 are typically more reliable because each machine 10 is smaller and simpler in design than traditional agricultural equipment, resulting in fewer machine malfunctions or failures and less time to repair when a malfunction or failure occurs. Furthermore, if a group of autonomous machines 10 is used for an operation, the failure or malfunction of one or two machines 10 would typically have limited impact on the overall operation as the remaining machines 10 could continue operating. The use of autonomous machines 10 may result in increased productivity as autonomous machines 10 are not limited by operator availability and may work continuous all day and all night.

The controller 20 is configured to control the machine 10 to follow a guidance path 38 and to perform an agricultural operation, such as planting seeds, along the guidance path 38. A guidance path (also referred to herein as a "reference path"), such as the path 38 illustrated in FIG. 3, may be stored on the machine 10 or may be communicated to the machine 10 via the communications component 30. The path 38 is illustrated and described herein on a two-dimensional plane defined by an X axis and a Y axis, as variations in ground surface altitude are negligible and, thus, it may be assumed that the machine 10 is operating on a flat surface and the third dimension (Z axis) may be neglected. Therefore, the machine's position may be defined by a location ($P_X$, $P_Y$) of the machine's center 40 and an orientation of the machine's heading vector 42.

Figure 3:
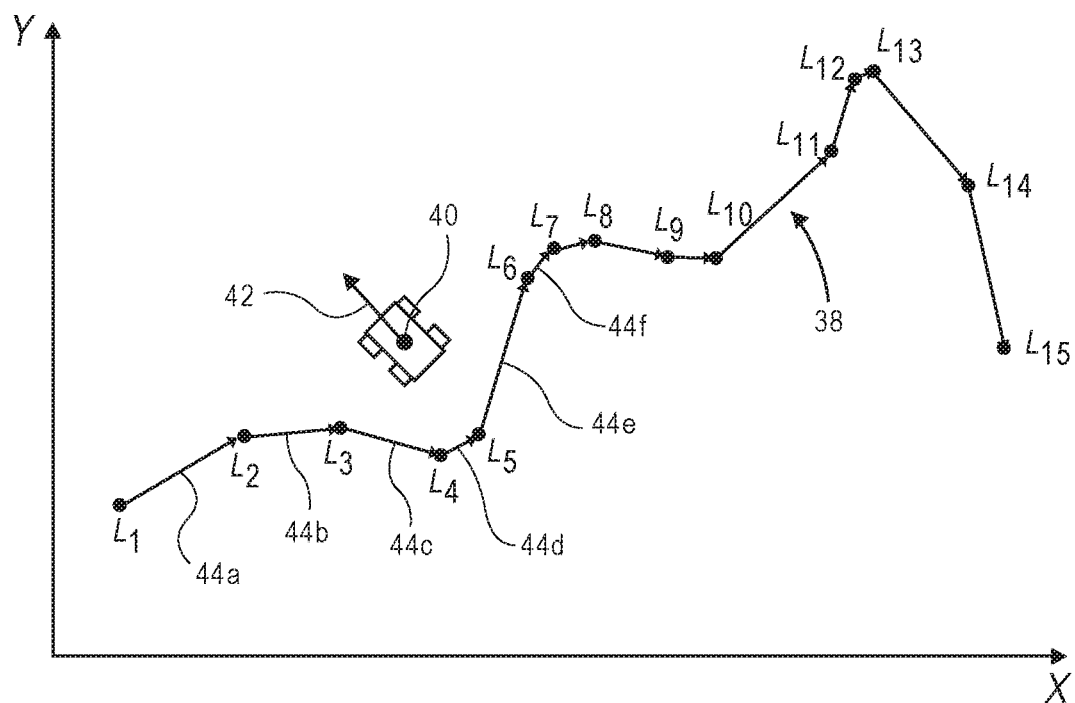
FIG. 3 illustrates an exemplary guidance path used by the mobile machine of FIG. 1 when performing an agricultural operation.

The guidance path 38 illustrated in FIG. 3 is defined by a series of geographic locations L1-L15, also referred to herein as landmarks, connected by direction vectors 44a-f defining a direction of travel from one landmark to the next landmark. For curved paths a larger number of landmarks L results in a more accurate path definition. As the machine 10 travels along the guidance path 38, it uses each direction vector as a navigational reference until it arrives at the next direction vector, then uses that vector as a navigational reference. To determine which of the direction vectors the machine 10 is to use for its present navigational reference and when to switch to the next vector the machine 10 uses a method that is illustrated in FIG. 4 and explained below.

Figure 4:
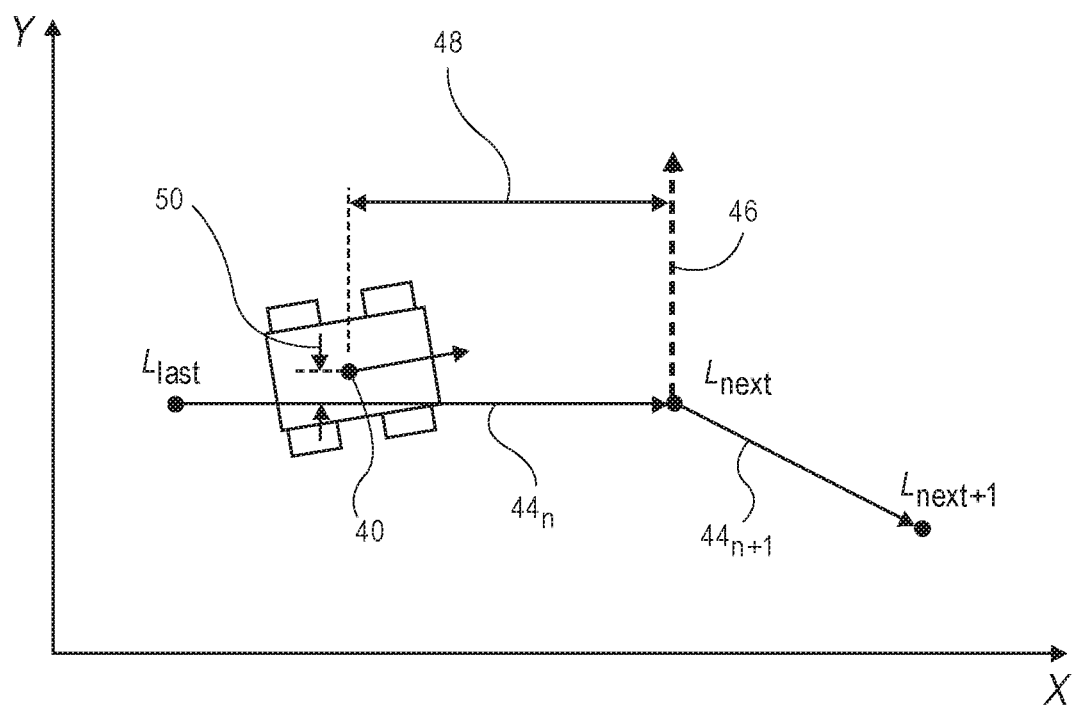
FIGS. 4-7 illustrate portions of the guidance path of FIG. 3 in greater detail and various markings used to illustrate how a guidance system of the mobile machine navigates the machine to follow the guidance path.

FIG. 4 depicts a scenario in which the machine 10 uses as a navigational reference a direction vector 44n, also referred to herein as the reference direction vector, defined by a previous landmark $L_{last}$ and a next landmark $L_{next}$. The distance 48 from the machine 10 to the next landmark $L_{next}$ is determined as the shortest distance between the machine's center 40 and a vector 46 passing through the next landmark $L_{next}$ that is orthogonal to the reference direction vector 44n. The distance 48 from the machine's center 40 to the next landmark will also be referred to herein as $d_{nlm}$. The orthogonal vector 46 may be determined using the reference direction vector 44n according to equation (1):

$$\vec{dir}_{ortho} = \begin{bmatrix} 0 & -1 \\ 1 & 0 \end{bmatrix} \cdot \vec{dir} \quad (1)$$

where $\vec{dir}_{ortho}$ is the orthogonal vector 46 and $\vec{dir}$ is the reference direction vector 44n. The distance 48 to the next landmark may be determined using the orthogonal vector 46 according to equation (2):

$$d_{nlm} = \frac{|\vec{dir}_{ortho} \times (\vec{r}_p - \vec{r}_{nlm})|}{|\vec{dir}_{ortho}|} \quad (2)$$

Neglecting the Z coordinate, equation (2) simplifies to equation (3):

$$d_{nlm} = \frac{\left\| \begin{matrix} dir_{orthoX} & r_{pX} - r_{nlmX} \\ dir_{orthoY} & r_{pY} - r_{nlmY} \end{matrix} \right\|}{\left\| \begin{pmatrix} dir_{orthoX} \\ dir_{orthoY} \end{pmatrix} \right\|} \quad (3)$$

If the absolute value of the determinant in equation (3) is ignored the distance $d_{nlm}$ 48 is positive or negative depending on the position of the machine 10 with respect to the orthogonal vector 46. Thus, when the sign of the distance $d_{nlm}$ 48 changes the machine 10 has crossed the orthogonal vector 46 and the reference direction vector 44n becomes the next direction vector 44n+1.

The distance 50 from the machine's center 40 to the reference direction vector 44n may be determined using a method similar to the method set forth above for finding the distance 48 to the orthogonal vector 46. Replacing the orthogonal vector ($\vec{dir}_{ortho}$) 46 with the reference direction vector 44n, ($\vec{dir}$) and replacing $\vec{r}_{nlm}$ with $\vec{r}_{llm}$ in equation (2) results in equation (4):

$$d = \frac{\left\| \begin{matrix} dir_X & r_{pX} - r_{llmX} \\ dir_Y & r_{pY} - r_{llmY} \end{matrix} \right\|}{\left\| \begin{pmatrix} dir_X \\ dir_Y \end{pmatrix} \right\|} \quad (4)$$

where d is the distance 50 between the machine center 40 and the reference direction vector 44n.

Figure 5:
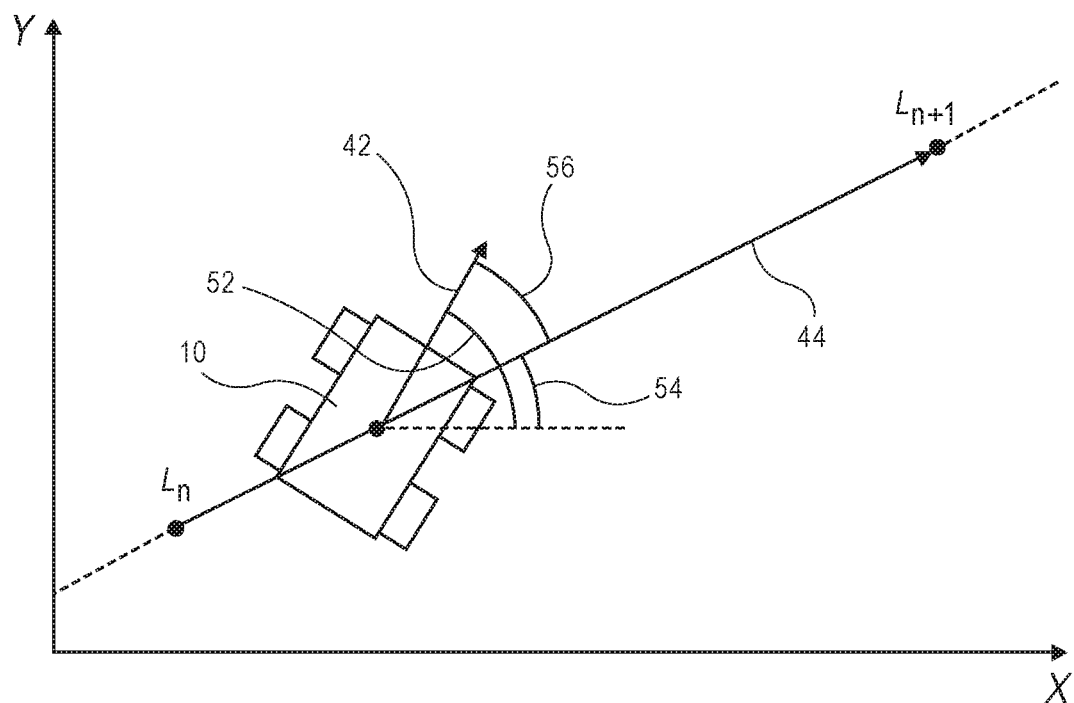

With reference now to FIG. 5, the machine's reference heading error $head_{err,rh}$ is illustrated. While the machine 10 in FIG. 5 is positioned on the reference heading vector 44, also referred to herein as the reference heading 44 (that is, d=0), the machine's heading vector 42 is not aligned with the reference heading 44. The machine's reference heading error $head_{err,rh}$ is the difference between the machine's heading, also referred to herein as the heading vector 42, and the reference heading vector 44. If an angle of the machine's heading vector 42 is defined by an angle 52 between the heading vector 42 and the X axis, and an angle of the reference heading vector 44 is defined by an angle 54 between the reference heading vector 44 and the X axis, the reference heading error head$_{err,rh}$ may be defined as the angle 56 corresponding to the difference between the angle 52 and the angle 54. Thus, in the scenario of FIG. 5 there is a need to adjust the machine's heading 42 to align with the reference heading 44. If the machine 10 were perfect in adjusting for reference heading errors, simply controlling the machine's heading 42 relative to the reference heading 44 would be sufficient to keep the machine 10 on the reference heading vector 44. In practice, however, even an efficient controller would not be able to perfectly adjust the machine's heading 42 and the machine 10 would deviate from the reference heading vector 44 such that d≠0.

Figure 6:
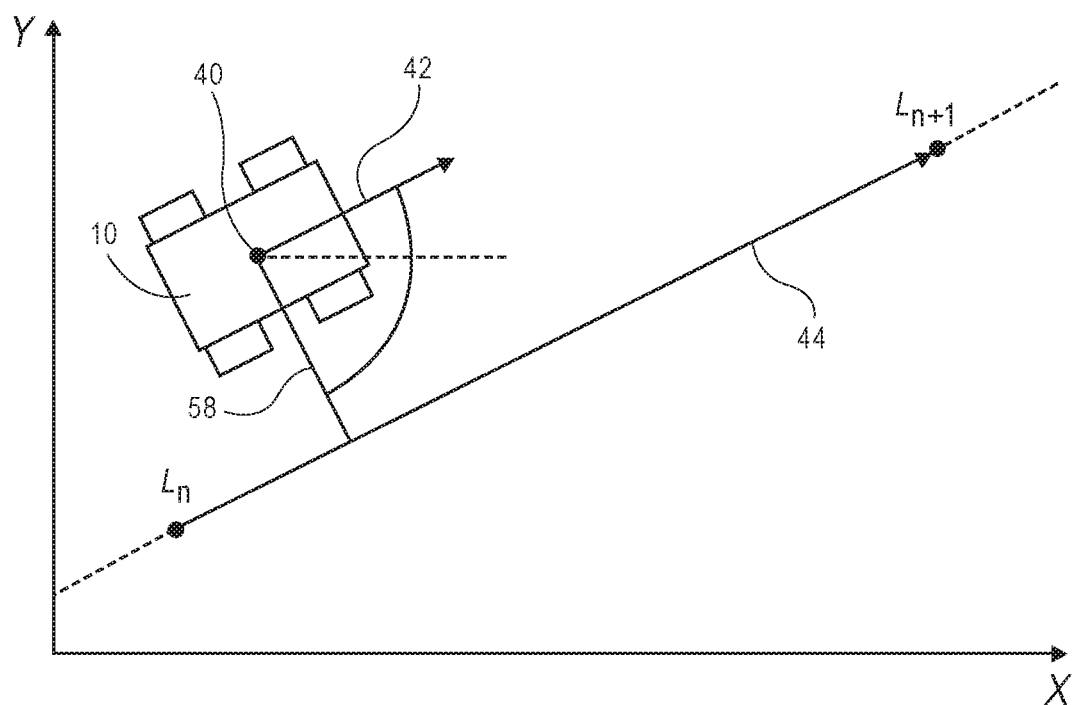

In the scenario depicted in FIG. 6 the machine 10 is not located on the reference heading vector 44 but the machine's heading 42, is parallel with the reference heading vector 44. In other words, the machine 10 has a distance error (d>0) but does not have a reference heading error head$_{err,rh}$. If the controller 20 were configured to adjust only the machine's heading 42 relative to the reference heading 44—and not to correct the machine's distance d from the reference heading vector 44—the machine 10 would continue to travel along a path parallel to the reference heading vector 44 (rather than move toward the reference heading vector 44) in the scenario depicted in FIG. 6 because the machine's reference heading error head$_{err,rh}$ is zero. Thus, the controller 20 must be configured to reduce the distance d to zero if the machine 10 is going to return to the reference heading vector 44.

A controller 20 configured to correct the distance error separately from the reference heading error head$_{err,rh}$ may attempt to follow the shortest line to the reference heading vector 44 by turning the machine 10 ninety degrees clockwise, driving along the line 58, and then when the machine 10 is on the reference heading vector 44 turn ninety degrees counterclockwise so that the machine's heading is once again aligned with the reference heading vector 44. Given that in practice the machine 10 will almost always be off the reference heading vector 44 by at least a small distance d, this approach would not be effective. Embodiments of the present invention involve controlling a machine 10 to follow a reference path by considering both reference heading errors and distance errors.

As the machine 10 follows the guidance path 38, its positioning error can be described by two heading errors—a distance heading error head$_{err,d}$ and a reference heading error head$_{err,rh}$. The distance heading error head$_{err,d}$ is the difference between the machine's actual heading, represented by the heading vector 42, and the optimal heading 44' to return the machine 10 to the reference heading vector 44. The optimal heading 44' to return the machine 10 to the reference heading vector 44 will also be referred to herein as the optimal heading 44'. The distance heading error head$_{err,d}$ is ninety degrees in the scenario illustrated in FIG. 6 because the optimal heading 44' to return the machine 10 to the reference heading vector 44 would be aligned with the line 58. The reference heading error head$_{err,rh}$ is the difference between the machine's actual heading represented by the heading vector 42 and the heading defined by the reference heading vector 44, as explained above. A control method addressing either one of these heading errors—without addressing the other—would be insufficient to navigate the machine 10 along the path 38 for the reasons set forth above. Embodiments of the present invention employ a control method that uses both heading errors to generate control signals for driving the machine 10 to follow the guidance path 38.

For convenience, reference is made herein to two controllers—a distance heading controller 108 and a reference heading controller 106. This dichotomy has reference to two control functions, a first that attempts to guide the machine 10 to be aligned with the optimal heading 44' and a second that attempts to guide the machine 10 to be aligned with the reference heading 44. It will be appreciated, however, that the discussion of the present invention in terms of two controllers does not require two distinct controllers to be implemented. In other words it does not require two distinct systems, two distinct devices or even two distinct pieces of software. Principles of operation of the two controllers may be combined into a single controller 20 presenting the functionality of two, combined controllers.

Figure 7:
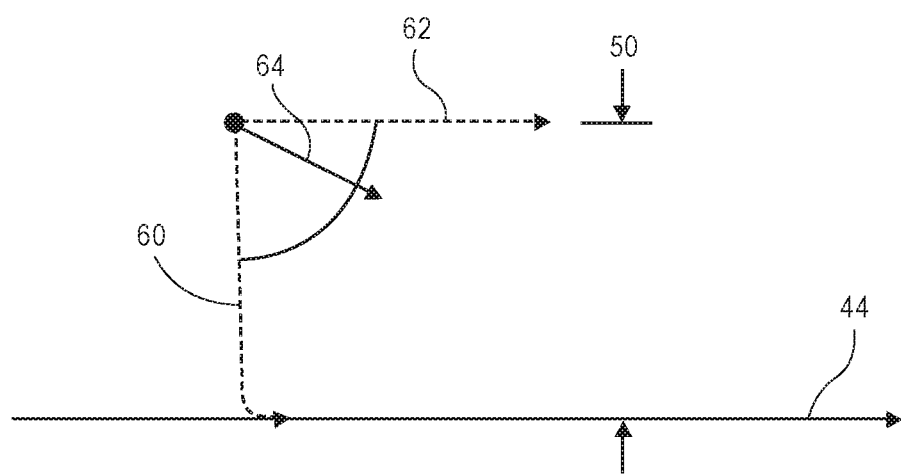

FIG. 7 illustrates exemplary interaction between the distance heading controller 108 and the reference heading controller 106. The distance heading controller 108 seeks to follow path 60 to reduce the distance d to zero and quickly return the machine 10 to the reference heading vector 44, while the reference heading controller 106 seeks to follow path 62 that is parallel with the reference heading vector 44 notwithstanding the distance d. Neither of these controller outputs is, by itself, a practical solution as explained above. Embodiments of the present invention use a combination of the distance heading controller 108 and the reference heading controller 106 to determine a target heading 64 that is then used to navigate the machine 10 toward and along the reference heading vector 44 that is part of the guidance path 38. As illustrated in FIG. 7, the target heading 64 is a combination of a heading generated by the reference heading controller 106 and a heading generated by the distance heading controller 108. More particularly, the controller 20 combines the two headings using a weighting algorithm that assigns a weight to each of the headings 60 and 62 according to the distance 50 of the machine 10 from the reference heading vector 44.

The controller 20 arbitrates the reference heading 44 and the distance heading 62 using a hyperbolic tangent function tan h according to the following equations:

$$\text{ratio}_{dc} = \tan h(\text{err}_{slope} \times |d|) \quad (5)$$

$$\text{ratio}_{hc} = 1 - \text{ratio}_{dc} \quad (6)$$

where ratio$_{dc}$ denotes the weight given the distance controller 108 and ratio$_{hc}$ denotes the weight given the heading controller 106. The additional gain for the error slope err$_{slope}$ in the argument is a tunable parameter that influences the slope of the hyperbolic tangent curve. Both ratio$_{dc}$ and ratio$_{hc}$ add up to one so that the total control output is never amplified.

Figure 8:
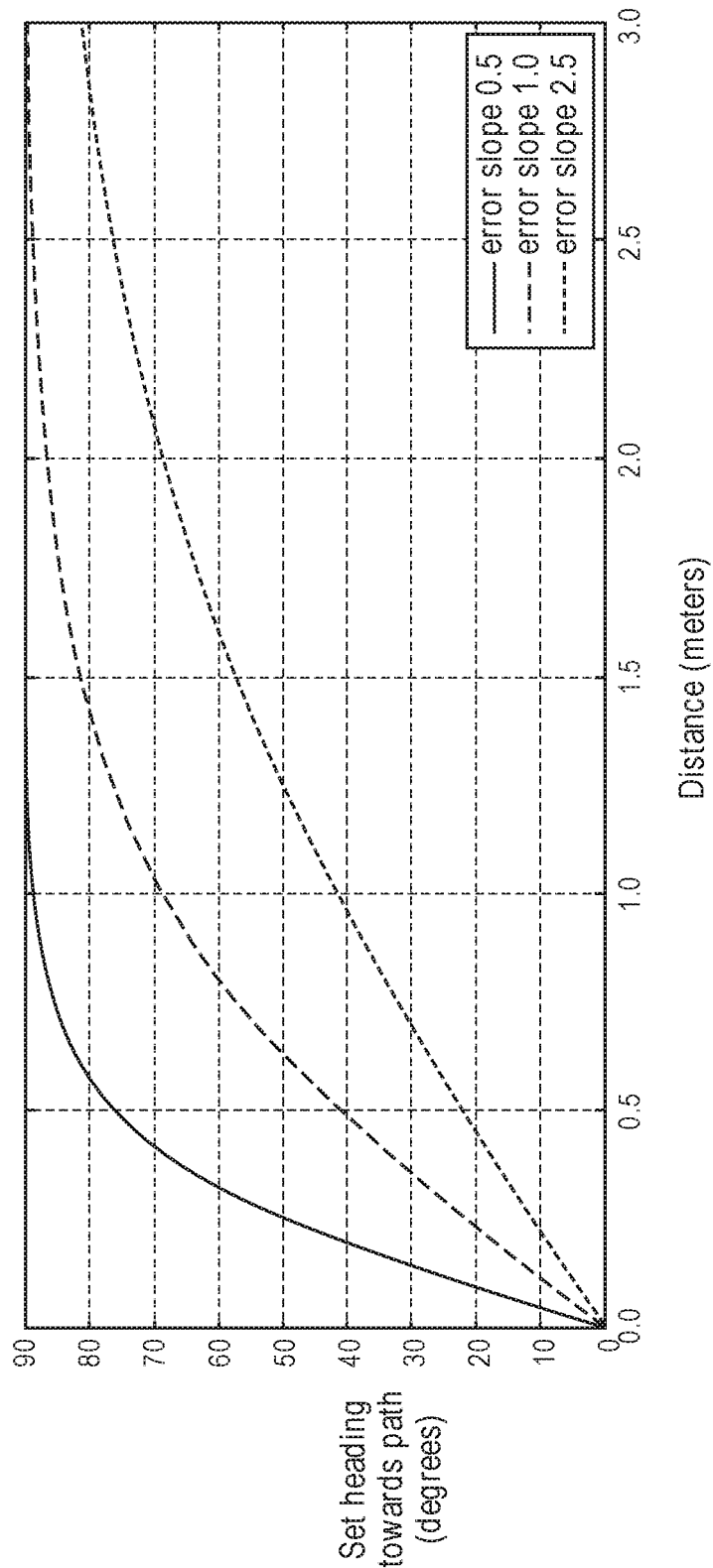
FIG. 8 is a graph illustrating how the orientation of the mobile machine changes according to a distance from the guidance path and for different values of an error slope parameter used with a control algorithm in accordance with embodiments of the present invention.
Figure 9:
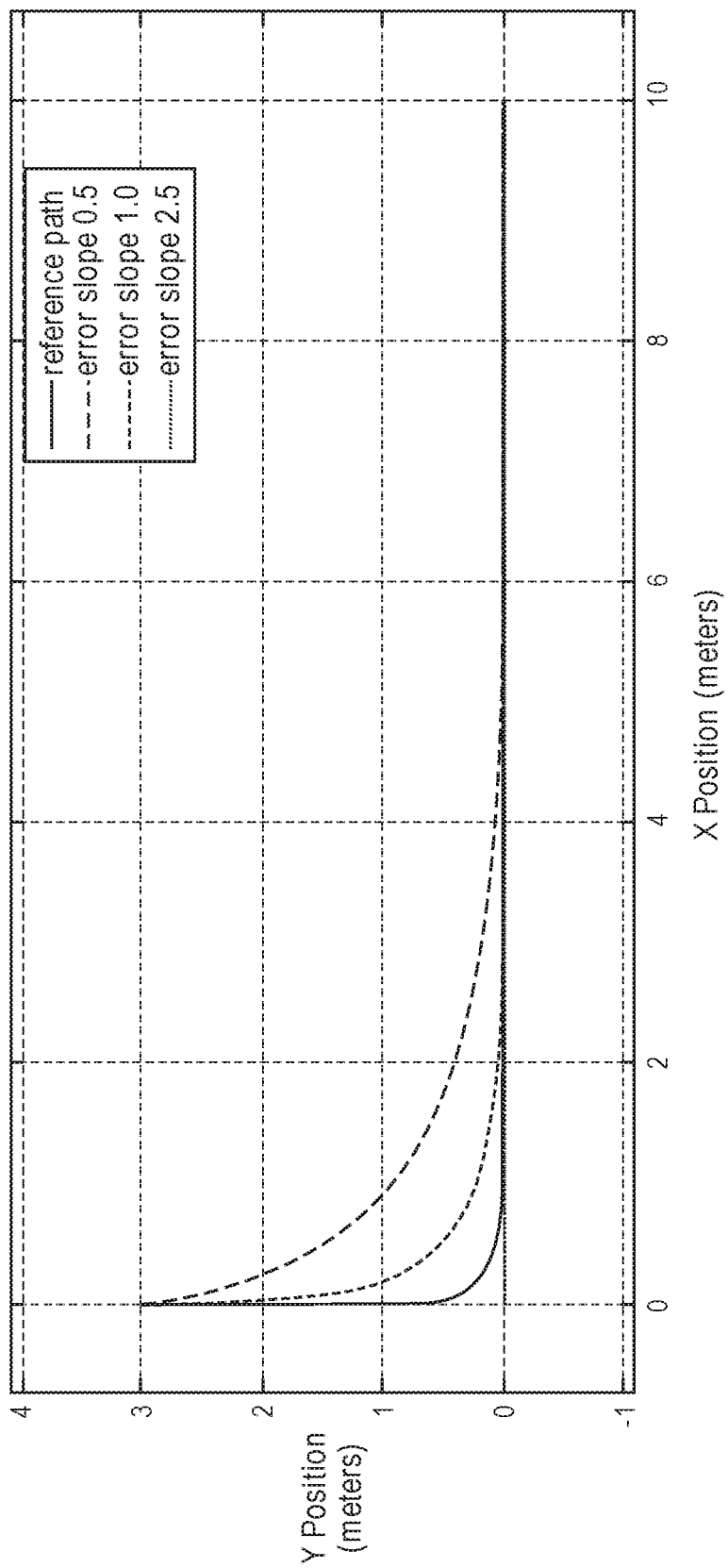
FIG. 9 is a graph illustrating paths followed by the mobile machine for different values of the error slope parameter used with the control algorithm.

FIG. 8 illustrates desired machine headings relative to the reference heading vector 44 dependent on the distance d between the machine 10 and the reference heading vector 44 and for different values of the error slope err$_{slope}$. The graphs of FIG. 8 illustrate that as the distance d between the machine 10 and the reference heading vector 44 increases, the target heading 64 angle increases toward ninety degrees. In other words, as the distance d between the machine 10 and the reference heading vector 44 increases the target heading 64 increasingly points towards the reference heading vector 44. FIG. 9 depicts approach shapes for different values of the error slope err$_{slope}$. When the machine 10 is more than one or two meters from the reference heading vector 44 (depending on the value of err$_{slope}$) it first drives straight toward the reference heading vector 44 to reduce the distance d, then follows a path that gradually turns to follow the reference heading vector 44.

Figure 10:
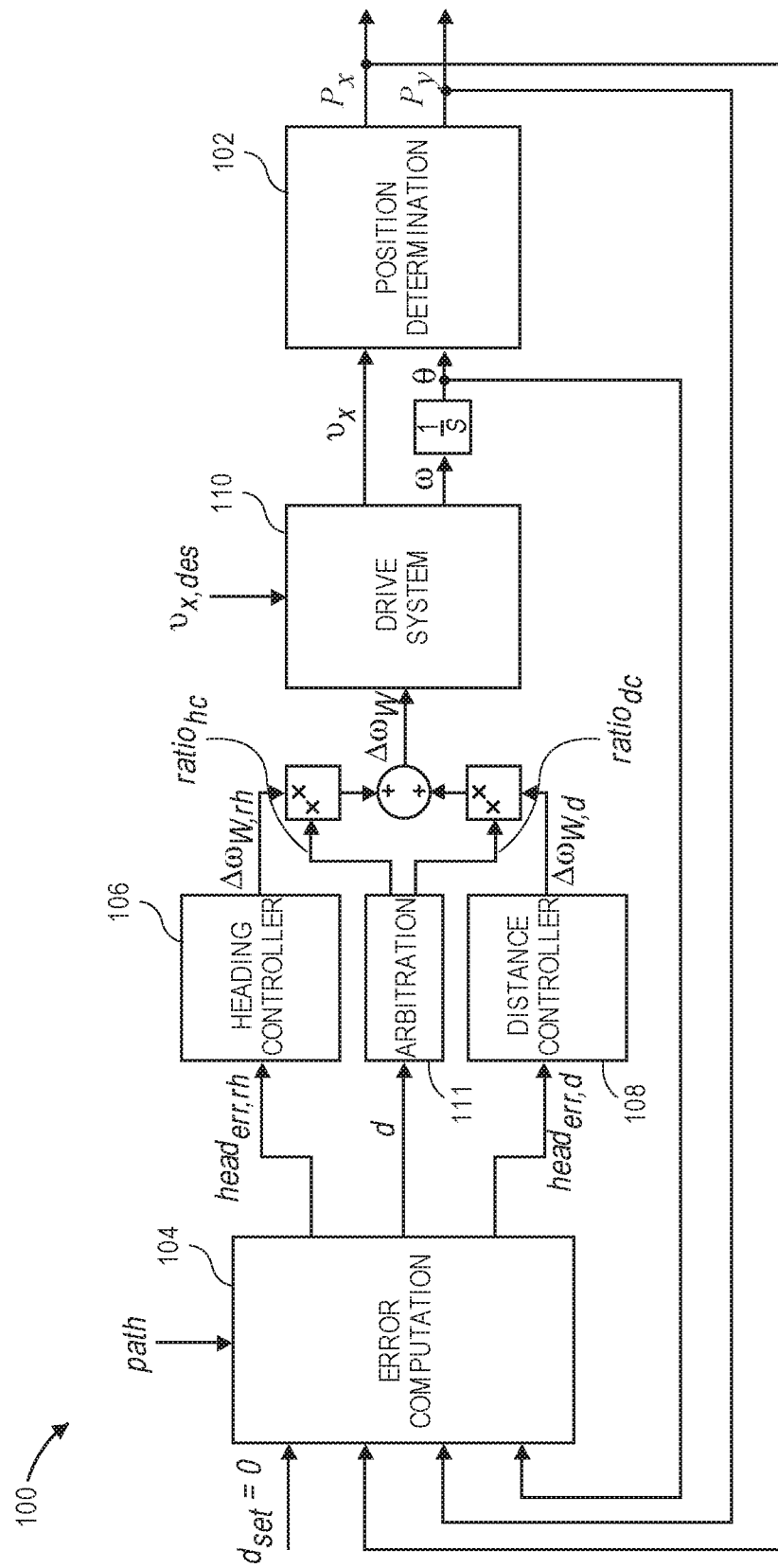
FIG. 10 is a diagram illustrating an exemplary first control structure for implanting a control algorithm for the mobile machine.

An exemplary competitive-cooperative control structure 100 is illustrated in FIG. 10 and may be implemented using the controller 20 described above. The control structure 100 includes various functions or sections referred to herein as modules with the understanding that each of the various modules may be implemented in hardware, software or a combination thereof. Furthermore, two or more of the modules may be combined into a single piece of hardware or software.

During operation the machine's velocity $v_x$ and yaw rate $\omega$ are detected, and the machine's orientation $\Theta$ is determined by integrating the yaw rate $\omega$ over time. A position determination module 102 uses the machine's velocity $v_x$ and orientation $\Theta$ to determine the machine's geographic position using equations (7) and (8):

$$P_x(t)=P_x(t=0)+\int v_x \cos \Theta dt \qquad (7)$$

$$P_y(t)=P_y(t=0)+\int v_x \sin \Theta dt \qquad (8)$$

An error computation module 104 receives data defining the guidance path 38, the machine's orientation $\Theta$ and the machine's position ($P_x,P_y$) and determines the distance d using equation (4) described above. The error computation module 104 also determines the reference heading error (head$_{err,rh}$) and the distance heading error (head$_{err,d}$) by comparing the machine's orientation $\Theta$ with the reference heading 44 and the distance heading 62. A heading controller module 106 receives the reference heading error head$_{err,rh}$ and a distance controller module 108 receives the distance heading error head$_{err,d}$. The heading controller module 106 implements a first proportional-integral-derivative (PID) control function to generate a first set of control values ($\Delta\omega_{W,rh}$) for operating the driven wheels 14 of the machine 10 to adjust the machine's heading to align with the reference heading 44. The first set of control values represents a change in the rotational speed of the driven wheel or wheels 14 on the left side and on the right side of the machine 10 necessary to steer the machine 10 to align with the reference heading 44. Similarly, the distance controller module 108 implements a second proportional-integral-derivative (PID) control function to generate a second set of control values ($\Delta\omega_{W,d}$) for operating the wheels of the machine 10 to align the machine's heading with the distance heading 62. The second set of control values represents a change in the rotational speed of the driven wheel or wheels 14 on the left side and on the right side of the machine 10 necessary to drive the machine 10 to align the machine 10 with the distance heading 62.

An arbitration module 111 receives the distance d from the error computation module 104 and generates the weight values ratio$_{dc}$ and ratio$_{hc}$ according to equations (5) and (6) as described above. The weight values are used as multipliers to adjust the first and second sets of control values to generate a first set of weighted control values and a second set of weighted control values. The first and second sets of weighted control values are added to generate a combined set of control values, and the combined set of control values is communicated to a drive system 110 and used to drive the wheels 14 of the machine 10 according to the designated machine velocity $v_{x,des}$ 44.

Figure 11:
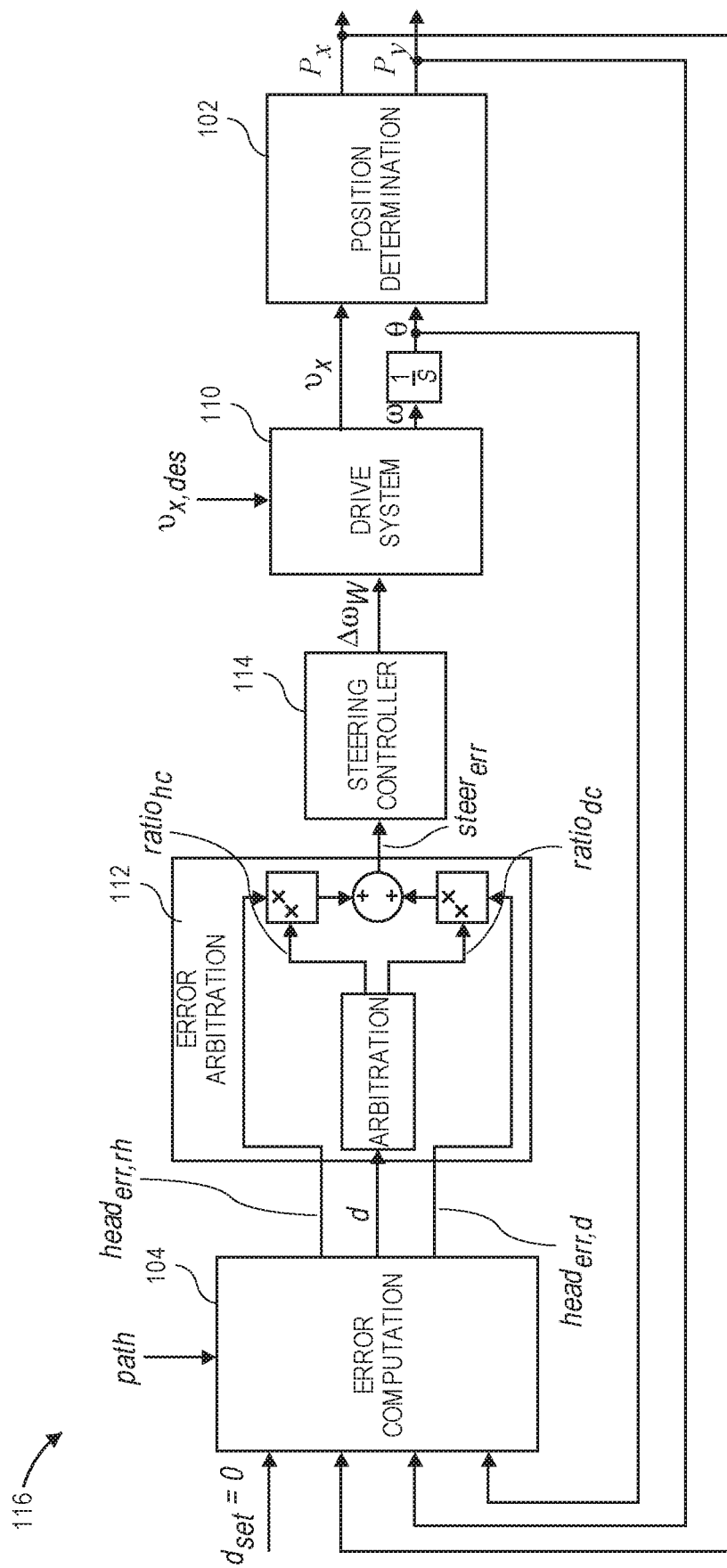
FIG. 11 is a diagram illustrating an exemplary second control structure for implanting a control algorithm for the mobile machine.

In the control structure illustrated in FIG. 10 a separate PID controller is employed by each of the heading controller module 106 and the distance controller module 108. This has some advantages in that each of the PID controllers may be separately adjusted, however it does render the analytical description of the system using classic signal theory more complex. An alternative implementation is illustrated in FIG. 11 that reduces the complexity by applying a single PID controller after the arbitration function rather than applying two separate PID controllers before the arbitration function. If both of the PID controllers have identical parameters, the value $\Delta\omega_W$ of FIG. 10 can be defined by the following equation:

$$\Delta\omega_W = \left(k_p + \frac{k_i}{s} + k_d s\right) \times head_{err,rh} \times \text{ratio}_{hc} + \qquad (9)$$
$$\left(k_p + \frac{k_i}{s} + k_d s\right) \times head_{err,d} \times (1 - \text{ratio}_{hc})$$

which can be rewritten as $$\Delta\omega_W = \qquad (10)$$
$$\left(k_p + \frac{k_i}{s} + k_d s\right) \times (head_{err,rh} \times \text{ratio}_{hc} + head_{err,d} \times (1 - \text{ratio}_{hc}))$$

Equation (10) illustrates that the heading errors may first be weighted using the error arbitration module 112, and then a single PID controller applied after the heading errors are weighted. For simplicity the PID controller is labeled steering controller 114 in FIG. 11.

The control structure 116 illustrated in FIG. 11 is simpler and easier to work with than the control structure 100 illustrated in FIG. 10. The control structure 116 may be further reduced. The heading controller 106 and the distance controller 108 act on headings that are always perpendicular to each other, therefore the target heading 64 of the machine 10 may be determined as a function of the distance d and the reference heading 44 as illustrated in equation (11):

$$\Delta\omega_W = \left(k_p + \frac{k_i}{s} + k_d s\right) \times \left(\left(head_{ref} - \frac{\pi}{2}\tanh(-err_{slope} \times d)\right) - \theta\right) \qquad (11)$$

Figure 12:
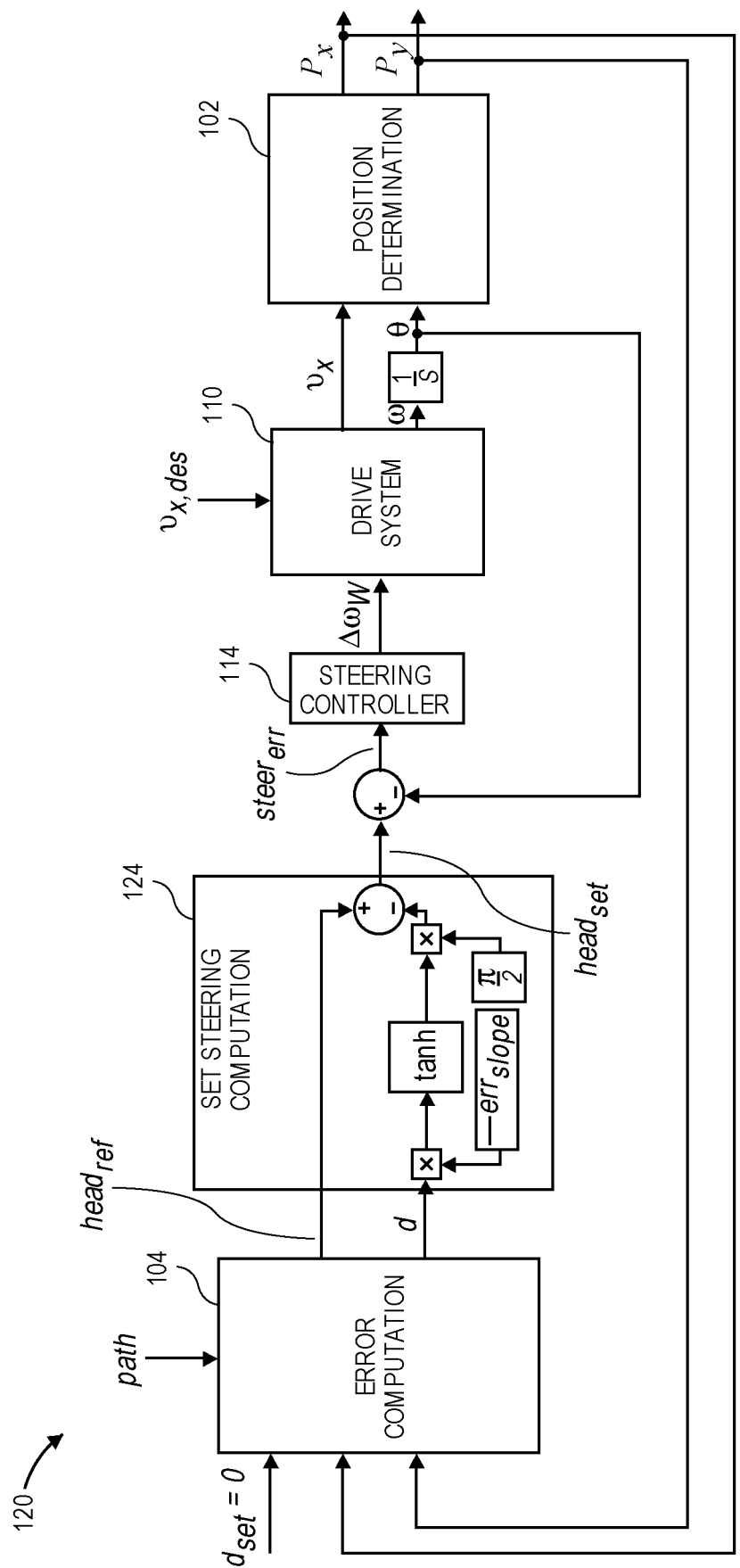
FIG. 12 is a diagram illustrating an exemplary third control structure for implanting a control algorithm for the mobile machine.

Applying equation (11), the control structure depicted in FIG. 11 can be reduced to the control structure 120 depicted in FIG. 12. The control structure 120 uses the reference heading 44 and the distance d, to determine a heading adjustment value dependent on the distance d, determines a steering error steer$_{err}$ by subtracting the heading adjustment value and the orientation $\Theta$ of the machine 10 from the reference heading 44, uses the steering error steer$_{err}$ to generate steering control signals, and communicates the steering control signals to the drive system 110.

More particularly, using the control structure 120, the error computation module 104 calculates the distance d and, if necessary, the reference heading 44 head$_{ref}$. It communicates the distance d and the reference heading 44 head$_{ref}$ to a set steering computation module 124. The set steering computation module 124 multiplies the distance d by the parameter error slope err$_{slope}$ and applies the hyperbolic tangent function tan h to the product of the values for distance d and the error slope err$_{slope}$. The set steering computation module 124 then multiplies the value of the hyperbolic tangent function by $\pi/2$, and subtracts that result from the reference heading 44 head$_{ref}$ to generate a set heading (head$_{set}$) value. The machine's orientation $\Theta$ is subtracted from the set heading head$_{set}$ value to generate a steering error steer$_{err}$, which is communicated to the steering controller module 114 to generate the $\Delta\omega_W$ value that is communicated to the drive system 110.

It should be noted that the control structure 120 includes two feedback loops. The inner loop controls the machine's heading while the outer loop reduces the distance d. Stated differently, the outer loop determines what the machine's heading should be (referred to herein as the "set heading" or head$_{set}$) while the inner loop controls the machine 10 to follow the set heading head$_{set}$. The outer loop is not a classic linear controller as its behavior follows a defined nonlinear function. The error slope (err$_{slope}$) is associated with the outer loop and influences the shape of the approach path followed by the outer control loop, as illustrated in FIGS. 8 and 9. FIG. 8 illustrates how the set heading head$_{set}$ changes according to the distance of the machine 10 from the guidance path 38 with different error slope err$_{slope}$ values. Larger error slope err$_{slope}$ values result in greater accuracy in that they enable the machine 10 to reach the guidance path 38 more quickly, but they also result in turns with smaller turning radii (that is, sharper turns) closer to the guidance path 38. This is also illustrated in FIG. 9, which charts machine paths corresponding to the different error slope err$_{slope}$ values of FIG. 8. Smaller turning radii can result in less stability, as explained below.

It should be noted that it is not necessary for the machine 10 to have a velocity to correct heading errors because the machine 10, being a skid-steer machine, can turn (that is, change its heading) when the machine's velocity is zero. Thus, the machine's velocity may be reduced to avoid or mitigate the accumulation of distance errors without impeding the machine's ability to correct for heading errors. The machine's velocity can even be reduced to zero to execute a turn with a turn radius of zero (in other words, a turn corresponding to a sharp corner).

The controller 20 may use one or more internal values as indicators to determine when the machine's speed should be adjusted. By way of example, the value of the steering error steer$_{err}$ (see, e.g., FIGS. 11 and 12) exceeding a particular threshold may indicate that the controller 20 is unable to adjust the machine's heading quickly enough to keep up with the changing set heading head$_{set}$. In that situation the distance of the machine's location from the reference path may continue to increase if the machine's heading cannot be corrected quickly enough. Therefore, in that situation it is desirable to temporarily reduce the machine's velocity to allow the controller 20 to correct the machine's heading before the distance grows larger. As the machine 10 slows down the controller 20 continues correcting the machine's heading. As the heading approaches the reference heading 44 the controller 20 may increase the machine's velocity to the designated velocity. If a large heading error is detected the controller 20 may reduce the velocity of the machine 10 to zero while the heading is corrected. This situation may occur, for example, when the machine 10 reaches a sharp bend (corner) in the reference path.

Figure 13:
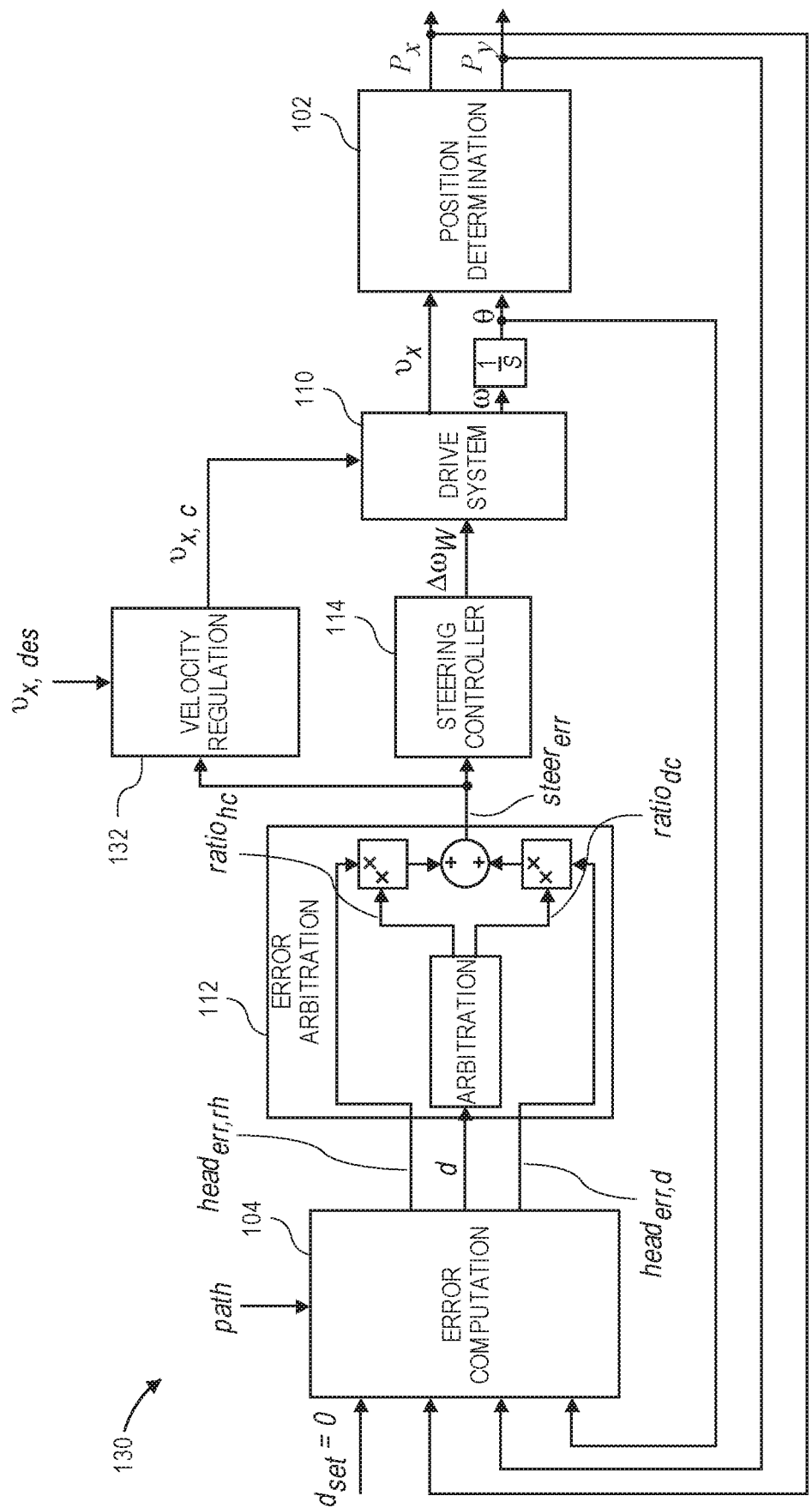
FIG. 13 is a diagram illustrating an exemplary fourth control structure for implanting a control algorithm for the mobile machine.
Figure 14:
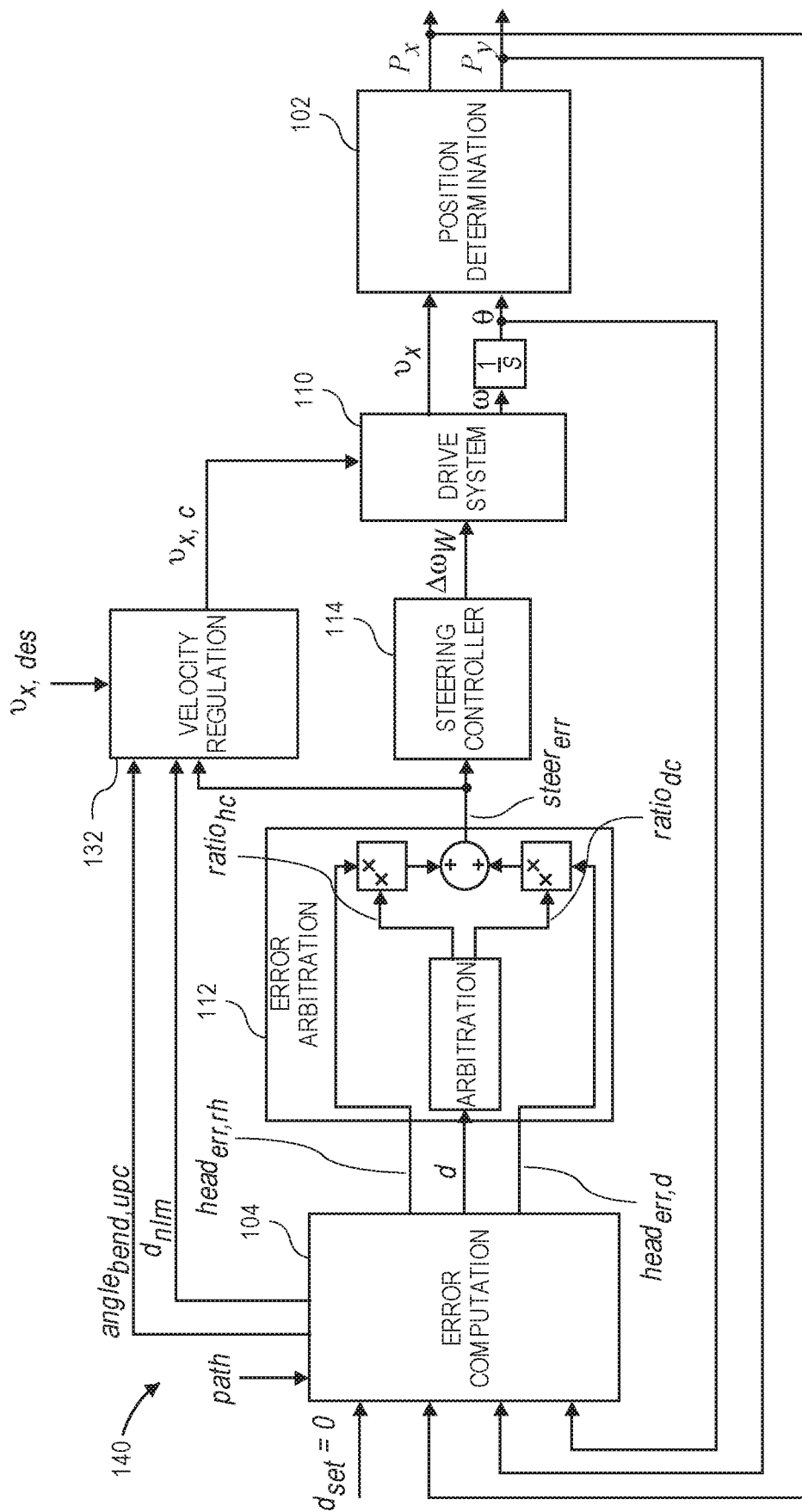
FIG. 14 is a diagram illustrating an exemplary fifth control structure for implanting a control algorithm for the mobile machine.

A control structure 130 according to one embodiment is illustrated in FIG. 13 and includes a velocity regulation module 132. In the control structures 100, 116 and 120 the drive system 110 receives the designated machine velocity v$_{x,des}$ and uses the designated machine velocity v$_{x,des}$ without regulating or adjusting the velocity. The velocity regulation module 132 of the control structure 130 receives the designated machine velocity v$_{x,des}$ and regulates it using the steering error (steer$_{err}$) value according to the following equation:

$$v_{x,c} = v_{x,des} \times (0.5 \times (1.0 - \tan h(vel_{slope} \times (|steer_{err}| - vel_{switch,err})))) \quad (12)$$

Where v$_{x,c}$ is the current velocity communicated to the drive system 110, veL$_{switch,err}$ is an error threshold and vel$_{slope}$ is a design parameter. It may not be desirable to regulate the velocity at all when the steering error steer$_{err}$ is relatively small. Hence, the error threshold veL$_{switch,err}$ is used to determine when the velocity regulation is engaged. By way of example, the value of the error threshold vel$_{switch,err}$ may be between five degrees and forty degrees. In some embodiments the value of the error threshold vel$_{switch,err}$ may be about fifteen degrees. The hyperbolic tangent function tan h provides for smooth changes in the machine's velocity and avoids abrupt changes that may occur when the steering error steer$_{err}$ crosses the error threshold vel$_{switch,err}$ without the use of the hyperbolic tangent function tan h. It was found in testing a particular prototype that a value for design parameter vel$_{slope}$ of 6.85 was effective, but different values of the design parameter vel$_{slope}$ will be optimal for different machines 10 and in different applications.

Because the controller 20 has guidance path information defining the guidance path 38, it can anticipate a need to adjust the machine's velocity. This is beneficial because in practice machines 10 are typically unable to stop immediately such as, for example, where there is a sharp bend or corner in the guidance path 38. In that situation by the time the controller 20 reacts to the change in heading and stops the machine 10, the machine 10 would have passed the bend and left the guidance path 38. Anticipating the bend in the guidance path 38 and reducing the machine's velocity v$_{x,c}$ in advance of reaching the bend helps to avoid the problem of overshooting the bend. This approach also takes advantage of the machine's ability to execute a zero radius turn. On very sharp bends or corners, for example, the machine's velocity v$_{x,c}$ may be reduced to zero while the machine's heading is adjusted.

Equation 13 is an algorithm that may be used by the machine 10 to implement the feedforward velocity adjustment:

$$ff_{speed} = v_{x,des} \times \left(1 - \left(0.5 \times (1 - (\tanh(-ff_{slope,ang} \times (|angle_{bend,upc}| - ff_{th,ang})))) \times \left(\left(1 - \left(\tanh\left(|d_{nlm}| \times \frac{slope_{dist,rem}}{v_{x,des}}\right)\right)\right)\left(1 - \frac{0.1}{v_{x,des}}\right)\right)\right)\right) \quad (13)$$

where ff$_{speed}$ is the current velocity v$_{x,c}$ of the machine 10, if, ff$_{slope,ang}$ is a user-specified design parameter affecting the slope of the hyperbolic tangent curve as discussed above, angle$_{bend,upc}$ is the angle of the next bend, ff$_{th,ang}$ is a user-specified angel threshold, d$_{nlm}$ is the distance to the next bend and slope$_{dist,rem}$ is a user-defined parameter affecting the slope of the second hyperbolic tangent curve.

In this equation there are two hyperbolic tangent functions. The first hyperbolic tangent function ensures that the feedforward velocity management is used only if the angle of the upcoming turn in the guidance path 38 exceeds the angle threshold ff$_{th,ang}$. In other words, if the angle of the upcoming turn in the guidance path is small (less than the angle threshold ff$_{th,ang}$) there is less need to use the feedforward velocity management and the velocity regulation module 132 primarily uses the steering error (steer$_{err}$) to regulate the velocity. The first hyperbolic tangent function softens the engagement of the feedforward regulation.

Figure 15:
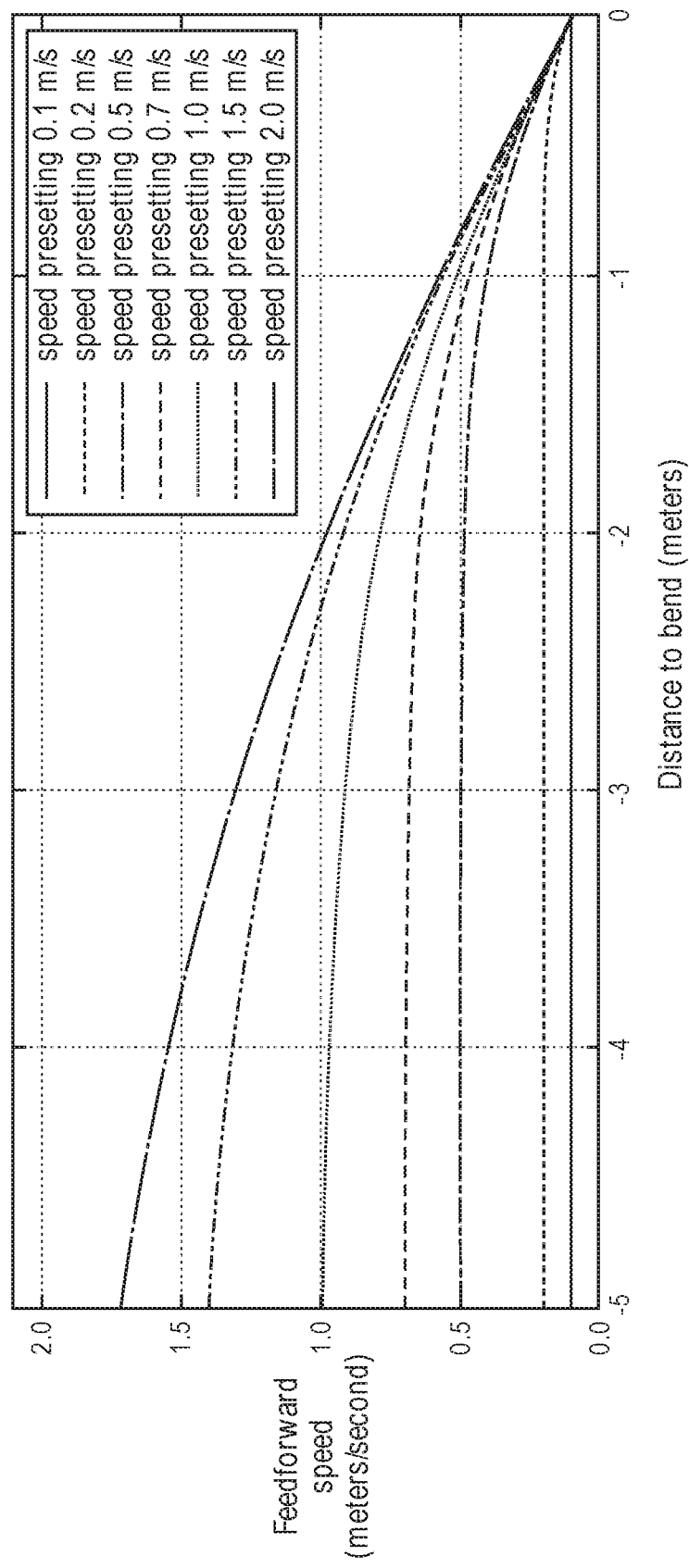
FIG. 15 is a graph illustrating feedforward speeds of the mobile machine at different distances from the guidance path and for different preset speeds, using a feedforward speed control function that takes into account the preset designated velocity.
Figure 16:
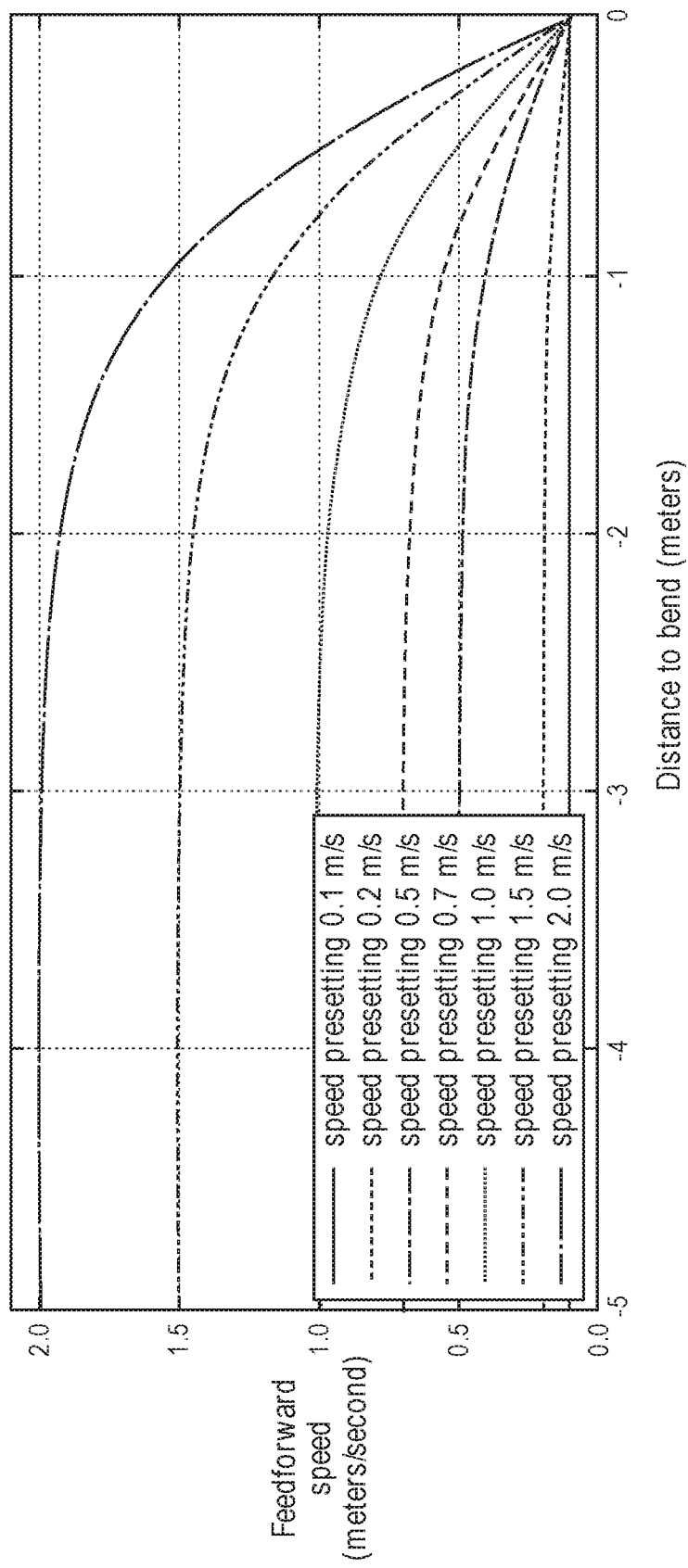
FIG. 16 is a graph illustrating feedforward speeds of the mobile machine at different distances from the guidance path and for different preset speeds, using a feedforward speed control function that does not take into account the preset designated velocity.

The second hyperbolic tangent function in equation (13) regulates the machine's velocity as a function of the distance remaining to the turn in the guidance path 38. Because the designated velocity $v_{x,des}$ is in the denominator of the slope$_{dist,rem}/v_{x,des}$ term, the slope of the hyperbolic tangent curve changes according to the designated velocity $v_{x,des}$. More particularly, the higher the designated velocity $v_{x,des}$, the smaller the slope. FIG. 15 illustrates velocity curves resulting from equation (13) at various designated velocities $v_{x,des}$. By comparison, FIG. 16 illustrates the velocity curves in the same situations as in FIG. 15 except that the controller 20 does not use a slope term with the designated velocity $v_{x,des}$ in the denominator. As can be seen from FIG. 16, if the slope is not adjusted for the designated velocity $v_{x,des}$, the velocity decreases rapidly within the last one to two meters, perhaps requiring active braking which wastes energy.

In order for the machine 10 to have the same velocity within a close proximity to the turn, the slope of the hyperbolic tangent curve is changed for different initial velocities of the machine 10. The slope of the hyperbolic tangent curve, then, is a design parameter. Exemplary skeleton computer code for implementing velocity regulation as described herein is set forth in Table 1, below.

TABLE 1

```
// steer error velocity regulation
static float vel_slope = 6.85;
static float vel_switch_err = 0.27;
// feedforward velocity reduction
static float Vx_max = 0.5;
static float ff_bendang_th = M_PI/6;
static float ff_bendang_slope = 9;
static float slope_remaing_dist = 0.5;
void regulateVelocity(struct thread_data* th_data)
{
    // calculate next bend angle
    float next_bend_ang_temp;
    next_bend_ang_temp = th_data->next_refHead - th_data->refHead;
    if (fabs(next_bend_ang_temp) > M_PI) {
        if (th_data->next_refHead < 0) {
            next_bend_ang_temp = th_data->next_refHead - th_data->refHead + 2*M_PI;
        }
        if (th_data->refHead < 0) {
            next_bend_ang_temp = th_data->next_refHead - th_data->refHead - 2*M_PI;
        }
    }
    next_bend_ang = next_bend_ang_temp;
    // speed regulation feedforward approach (0.1 m/s is minimum feedforward speed)
    if(Vx_max > 0.1) {
        ff_speed = Vx_max *
        (1-(0.5*(1-(tanh(-ff_bendang_slope*(fabs(next_bend_ang)-ff_bendang_th)))) *
        ((1-(tanh(fabs(th_data->d_nlm)*slope_remaing_dist/Vx_max)))*(1-
        0.1/Vx_max))));
    } else {
        ff_speed = Vx_max;
    }
    // calculate speed as combination of feedforward and steer error
    th_data->speed_control = ff_speed *
    (0.5*(1.0-tanh(vel_slope*(fabs(steeringError)-vel_switch_err))));
}
```

The control structure 120 can become unstable in situations where the error slope (err$_{slope}$), the machine's velocity, or both are relatively high. This can happen where the set heading head$_{set}$ defined by the outer loop of the cascading control structure changes at a rate faster than the machine's maximum yaw rate. In other words, the outer loop in the control structure 120 defines a path that the inner loop cannot keep up with. When that happens, the machine 10 overshoots a bend in the defined path. When the controller 20 attempts to correct the overshoot it may define another path with a heading change that exceeds the machine's maximum yaw rate, causing the machine 10 to again overshoot the defined path. This may lead to the machine 10 oscillating around the guidance path, even if the guidance path is a straight line.

As illustrated in FIGS. 8 and 9, larger values of the error slope err$_{slope}$ result in larger heading changes closer to the guidance path. Additionally, the greater the machine's velocity the more quickly it must change its heading to keep up with changes in the set heading head$_{set}$ during the turn. For these reasons the machine 10 is most susceptible to this instability at higher values of the error slope err$_{slope}$ and higher machine velocities. Adjusting the machine's velocity can mitigate this problem, as explained above, but solving the problem by reducing the machine's velocity may not always be desirable. Therefore, the present invention includes a solution to this problem that involves dynamically adjusting the value of the error slope err$_{slope}$ independently of the velocity. With reference again to FIGS. 8 and 9, the controller 20 may use the machine's maximum yaw rate to adjust the error slope err$_{slope}$ so that the machine's turn is more gradual and the heading change never exceeds the machine's maximum yaw rate. Some embodiments may employ both velocity adjustment and error slope adjustment. Embodiments automatically adjust the error slope err$_{slope}$ to avoid instability while maintaining optimal tracking performance by maintaining the error slope err$_{slope}$ as high as possible without sacrificing stability.

The set heading head$_{set}$ is defined as $$\frac{\partial \theta_{set}}{\partial t},$$

which (applying the chain rule) is equivalent to:

$$\frac{\partial \theta_{set}}{\partial t} = \frac{\partial \theta_{set}}{\partial d}\frac{\partial d}{\partial t} \quad (14)$$

As the mobile machine 10 is located a distance d from the reference path, according to the control algorithm, the desired set heading for the machine 10 may be computed using:

$$\theta_{set} = \left(\frac{\pi}{2} - \frac{\pi}{2}\tanh(d \times err_{slope})\right) \quad (15)$$

Assuming that the mobile machine 10 can respond immediately and perfectly to changes in the set heading (that is, $\Theta=\Theta set$), the distance d changes with time according to:

$$\frac{\partial d}{\partial t} = -v_x \cos \theta_{set} \quad (16)$$

Using equations (14), (15) and (16), the change rate of the set heading over time can be defined as:

$$\frac{\partial \theta_{set}}{\partial t} = \quad (17)$$
$$\frac{\pi}{2}err_{slope}(1 - \tanh^2(d \times err_{slope}) \times v_x \cos(\frac{\pi}{2} - \frac{\pi}{2}\tanh(d \times err_{slope})))$$

Figure 17:
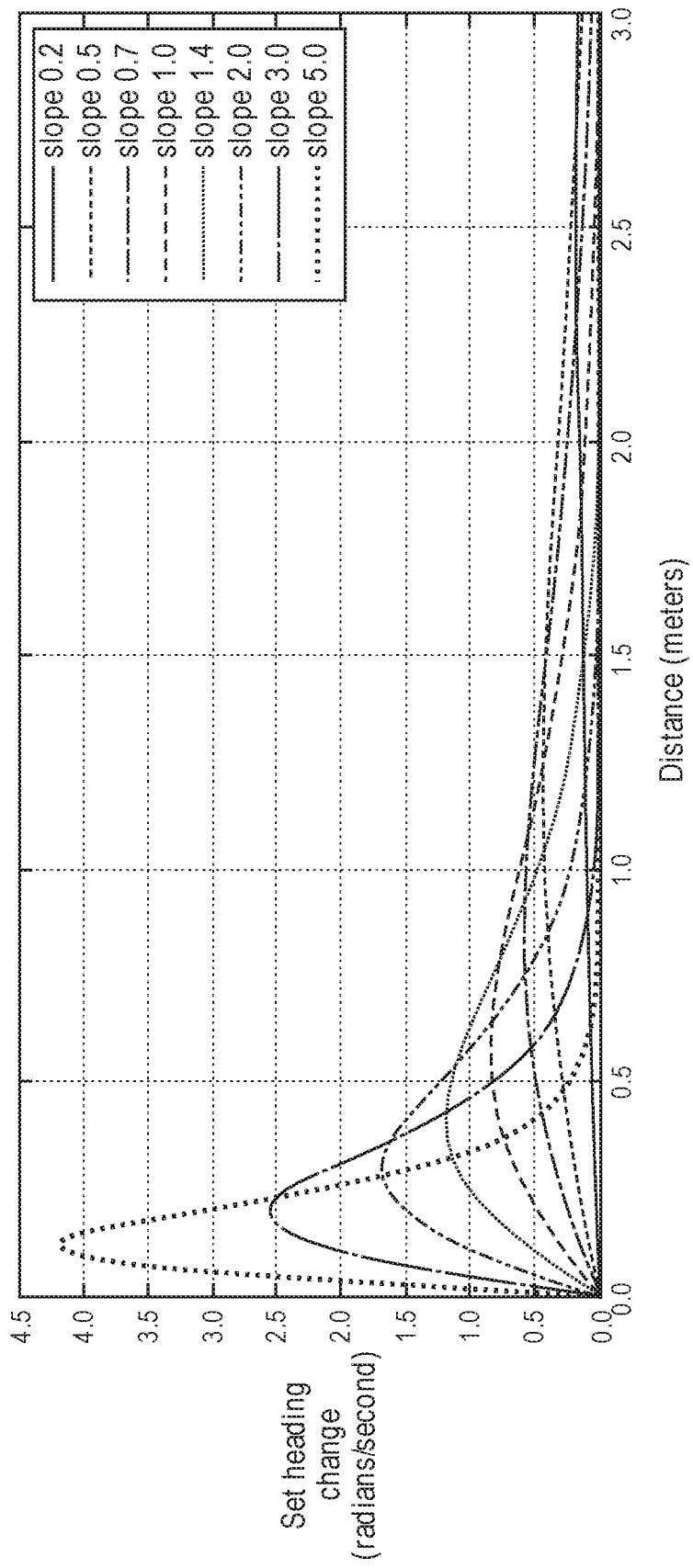
FIG. 17 is a graph illustrating a rate of machine heading change at various distances from the guidance path, at a constant velocity and for different values of the error slope parameter, using a control algorithm in accordance with embodiments of the invention.
Figure 18:
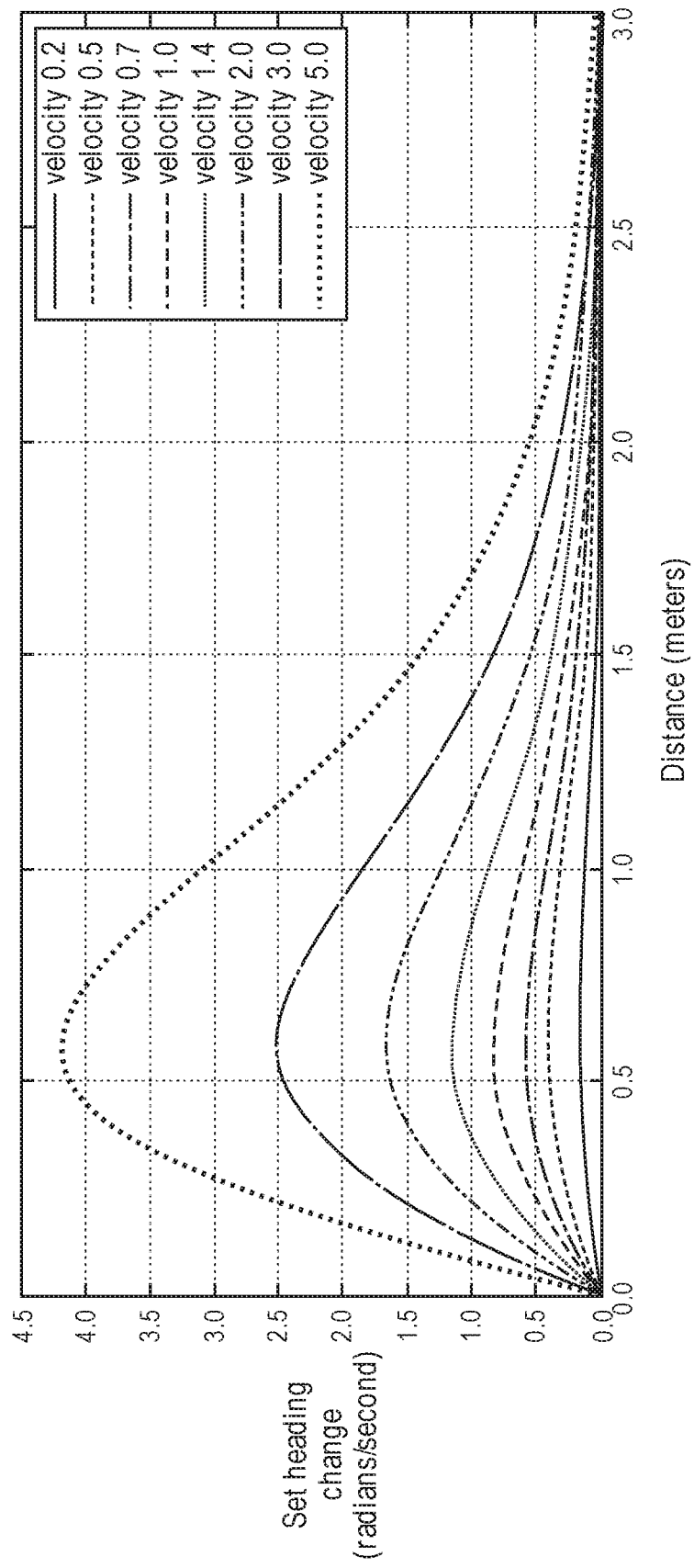
FIG. 18 is a graph illustrating a rate of machine heading change at various distances from the guidance path, for a single error slope parameter and for different velocities, using a control algorithm in accordance with embodiments of the invention.

This function is plotted in FIG. 17 for a constant velocity of one meter per second and different values of the error slope $err_{slope}$, and in FIG. 18 for an error slope $err_{slope}$ of 1.0 and different speeds. FIGS. 17 and 18 illustrate that for each value of the error slope $err_{slope}$ there is a peak rate of change of the machine's heading. The larger the value of the error slope $err_{slope}$ the higher the peak and the closer it is to the reference path.

If the error slope $err_{slope}$ remains constant the controller 20 must use the error slope $err_{slope}$ value with a peak that does not exceed the mobile machine's maximum yaw rate to preserve stability. As can be seen from the graphs depicted in FIG. 17 and FIG. 18, if the peak rate of change is limited to the mobile machine's maximum yaw rate the mobile machine 10 will be operating below its maximum yaw rate for most of the path toward the reference path. This approach would not take full advantage of the mobile machine's turning ability and may not be the most effective approach for balancing stability and accuracy.

Figure 19:
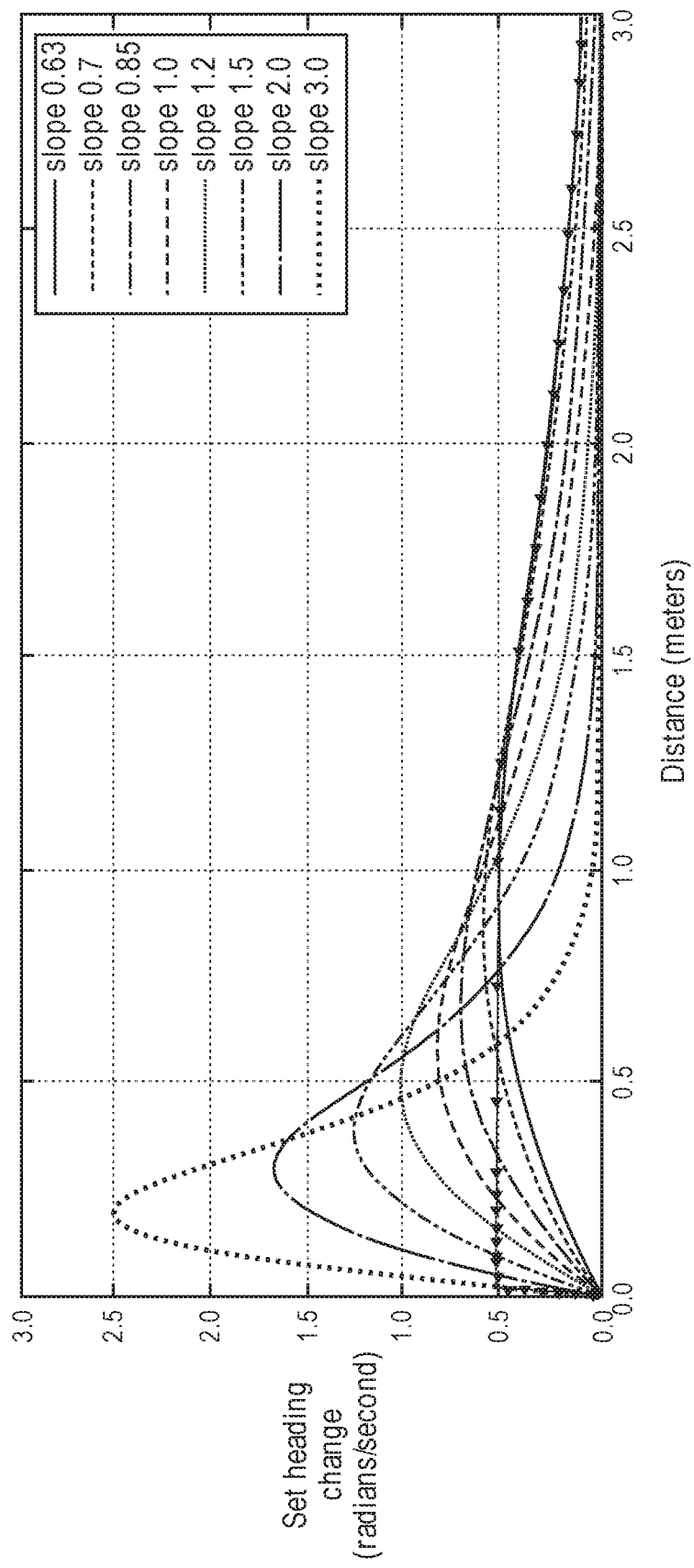
FIG. 19 is a graph illustrating an error slope value adjusted according to a control algorithm for different distances of the machine from the guidance path to preserve stability of the mobile machine.
Figure 20:
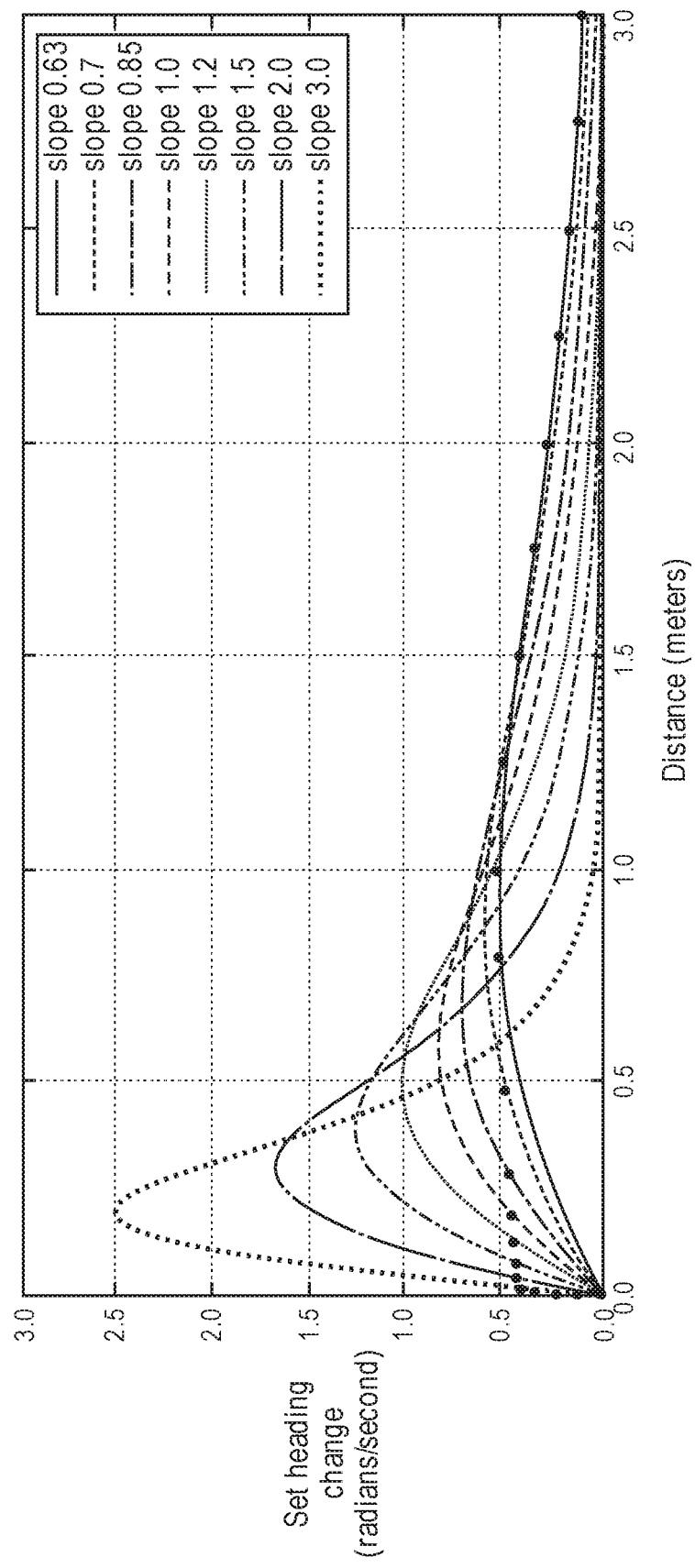
FIG. 20 is a graph illustrating an error slope value adjusted according to a control algorithm for different distances of the machine from the guidance path to preserve stability of the mobile machine.

In some embodiments of the invention the controller 20 makes use of an adaptation algorithm to adjust the error slope $err_{slope}$ to a maximum allowed value after the machine 10 has passed the peak yaw rate and according to the machine's speed and distance from the reference path. FIG. 19 illustrates the ideal or theoretical error slope $err_{slope}$ value where an initial error slope $err_{slope}$ value of 0.63 is used to determine the set heading $head_{set}$ until the mobile machine 10 has passed the peak yaw rate for that error slope value (0.84 meters from the reference path), at which time the error slope $err_{slope}$ value is adjusted to maintain the yaw rate at the maximum yaw rate corresponding to the error slope value of 0.63 until the maximum value of the slope is reached. FIG. 20 illustrates actual error slope $err_{slope}$ values calculated by the controller 20 dynamically using the approximations explained herein. This adaptation algorithm allows the mobile machine 10 to reach the reference path as quickly as possible while remaining stable.

The change of set heading may be approximated by equation (18) as follows:

$$\frac{\partial \theta_{set}}{\partial t} \approx \left(-\frac{10}{3}v_x err_{slope}^3\right) \times \left(d - \frac{1}{2err_{slope}}\right)^2 + \left(\frac{5}{6}v_x err_{slope}\right) \quad (18)$$

It should be noted that this approximation may not be accurate for portions of the path not between the point on the path corresponding to the peak yaw rate and the reference path, but that is not a problem here as the approximation is only used for portions of the path corresponding to the point on the path between the peak yaw rate and the reference path. Assuming the maximum yaw rate of the mobile machine 10 (or inner loop) is π/6 radians per second, the maximum error slope $err_{slope}$ may be determined by resolving equation (18) into the error slope $err_{slope}$ according to equation (19) as follows:

$$\frac{10}{3}v_x d^2 err_{slope}^3 - \frac{10}{3}v_x derr_{slope}^2 + \theta_{max} = 0 \quad (19)$$

This cubic equation without a linear term can be solved using Cardano's method. A cubic equation of the form $ax^3+bx^2+cx+d=0$ (where $a\neq 0$) always incorporates three real or one real and two complex roots. The general cubic equation is transformed into the reduced cubic equation $y^3+3py+q=0$, with $p=3ac-b^2$ and $q=2b^3-9abc+27a^2d$. The discriminant D is computed as $D=q^2+4p^3$. If D is less than zero there exist three different solutions, and the intermediate sizes are given as follows:

$$y_1 = \sqrt{-p} \times \left(2\cos\left(\frac{\varphi}{3}\right)\right) \quad (20)$$

$$y_2 = y_3 = \sqrt{-p} \times \left(2\cos\left(\frac{\varphi}{3} + \frac{4\pi}{3}\right)\right) \quad (21)$$

where $$\varphi = \arccos\left(\frac{-q}{2\sqrt{-p^3}}\right) \quad (22)$$

The solutions to the general cubic equation (19) by retransformation to the following:

$$x_1 = \frac{y_1 - b}{3a} \quad (23)$$

$$x_2 = \frac{y_2 - b}{3a} \quad (24)$$

$$x_3 = \frac{y_3 - b}{3a} \quad (25)$$

As we are concerned only with the path between the peak yaw rate and the reference path, the discriminant D is always less than zero and the desired solution is always $x_3$. Exemplary skeleton computer code for implementing the adaptation algorithm is set forth in Table 2, below. The only input into the adaptation system is the actual distance error relative to the reference path and the velocity of the mobile machine 10. The maximum error slope $err_{slope}$ and the maximum yaw rate are predefined.

another embodiment, the machine 10 may include track assemblies instead of wheels, such as one track assembly on each side for a total of two track assemblies. The machine 10 may be configured to perform any of various different agricultural operations including, without limitation, planting seeds, applying fertilizer and applying pesticide or herbicide.

TABLE 2

```
static float achievable_yawrate = 25.0 * M_PI / 180.0;
float solve_cubic_equation(float yawrate_achievable, float veloc, float distance)
{
    float a = distance;
    float b = - 1.0;
    float c = 0.0;
    float d = 3.0*yawrate_achievable/(10.0*veloc*distance);
    float p = 3.0*a*c-pow(b,2);
    float q = 2.0*pow(b,3) - 9.0*a*b*c +27.0*pow(a,2)*d;
    float D = pow(q,2) + 4.0*pow(p,3);
    float phi = acos(-q/(2*sqrt(-pow(p,3))));
    float y_3 = sqrt(-p)*(2*cos(phi/3+4*M_PI/3));
    float x_3 = (y_3-b)/(3*a);
    return x_3;
}
float calculate_adaptive_slope(float yawchange_max, float errslope_max, float vel, float
dist_act)
{
    if (vel < 0.2) {
        return 1.0;
    }
    if (dist_act < 0.001) {
        return errslope_max;
    }
    float err_slope_stable = 6.0 / 5.0 * yawchange_max / vel;
    if (err_slope_stable > errslope_max) {
        return errslope_max;
    }
    float vertex = 1 / (2.0 * err_slope_stable);
    if (dist_act > vertex) {
        return err_slope_stable;
    }
    else {
        float optimized_slope = solve_cubic_equation(yawchange_max,vel,dist_act);
        if (optimized_slope > errslope_max) {
            return errslope_max;
        }
        else {
            return optimized_slope;
        }
    }
}
void slope_adaption(struct thread_data* th_data)
{
    float slope_max = 1.5/th_data->speed_control;
    float slope_adaptive =
    calculate_adaptive_slope(achievable_yawrate,slope_max,th_data->speed_control,
    fabs(th_data->distance_error));
    if (slope_adaptive > 3.0) {
        slope_adaptive = 3.0;
    }
    err_slope = slope_adaptive;
}
```

Although the invention has been described with reference to the preferred embodiment illustrated in the attached drawing figures, it is noted that equivalents may be employed and substitutions made herein without departing from the scope of the invention as recited in the claims. By way of example, while the machine 10 has four wheels including two driven wheels, other configurations are within the ambit of the present invention. The machine 10 may include four driven wheels, or a total of three wheels including two driven wheels and a single caster wheel. In yet

The invention claimed is:

1. A mobile machine comprising:

a chassis;

a plurality of ground-engaging elements for supporting the chassis on a ground surface and propelling the chassis relative to the ground surface, each of the plurality of ground-engaging elements being at a fixed angle relative to the chassis;

a plurality of actuators for driving movement of the ground-engaging elements, each of the actuators being configured to drive movement of at least one of the ground-engaging elements independently of the other ground-engaging elements; and a controller for controlling each of the actuators to cause the mobile machine to follow a guidance path along a ground surface, the controller configured to receive a designated machine velocity, generate a first set of control values for driving the machine according to a first heading based on a reference heading error of the machine, generate a second set of control values for driving the machine according to a second heading based on a distance heading error of the machine, generate a current machine velocity using the designated machine velocity, the reference heading error, the distance heading error, a distance to a next path turn, an angle of the next path turn and applying a hyperbolic tangent function to a term derived from the angle of the next path turn, generate control signals for driving the machine by combining the first set of control values, the second set of control values, and the current machine velocity, and use the control signals to control the actuators to thereby cause the machine to follow the guidance path at the current machine velocity.

2. The mobile machine of claim 1, wherein the designated machine velocity is defined as a maximum machine velocity.

3. The mobile machine of claim 1, the controller further configured to— determine a weight scheme for the first set of control values and the second set of control values, the weight scheme depending on a distance error and giving greater weight to the set of control values with smaller distance errors and giving less weight to the set of control values with larger distance errors, the distance error being a distance between the machine's location and the guidance path, and generate the control signals for driving the machine by combining the first set of control values and the second set of control values according to the weight scheme.

4. The mobile machine of claim 3, the controller further configured to generate the current machine velocity using a steering error value, the steering error value being the result of the first set of control values and the second set of control values combined according to the weight scheme.

5. The mobile machine of claim 1, the controller being further configured to— apply a hyperbolic tangent function to a steering value derived from a steering error to generate a value of the hyperbolic tangent function, and determine the current velocity of the mobile machine using the value of the hyperbolic tangent function.

6. The mobile machine of claim 5, the steering value being defined as the product of a slope value and the difference between the steering error and an error threshold value.

7. The mobile machine according to claim 1, the controller further configured to— determine whether the angle of the next path turn exceeds a predetermined threshold, and if the angle of the next path turn exceeds the predetermined threshold, generate the current machine velocity using the distance to the next path turn.

8. The mobile machine of claim 7, the controller further configured to: begin decreasing the current machine velocity at a distance from the next path turn for a maximum designated velocity, and decreasing the current machine velocity at a decreased distance from the next path turn for a designated velocity less than the maximum designated velocity.

9. The mobile machine of claim 7, the controller further configured to generate the current machine velocity by— applying a hyperbolic tangent function to a term derived from the angle of the next path turn, and applying a hyperbolic tangent function to a term that is directly proportional to the distance to the next path turn and inversely proportional to the designated velocity.

* * * * *